US012685941B2

(12) United States Patent
Lyons

(10) Patent No.: US 12,685,941 B2
(45) Date of Patent: Jul. 21, 2026

(54) TRACKING GAMING PAYMENT-CARD TRANSACTIONS AND SPENDING LIMITS VIA TOKEN(S)

(71) Applicant: LNW Gaming, Inc., Las Vegas, NV (US)

(72) Inventor: Martin S. Lyons, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 244 days.

(21) Appl. No.: 18/474,941

(22) Filed: Sep. 26, 2023

(65) Prior Publication Data

US 2024/0100443 A1 Mar. 28, 2024

Related U.S. Application Data

(60) Provisional application No. 63/410,646, filed on Sep. 28, 2022.

(51) Int. Cl.
| | |
|---|---|
| *A63F 13/792* | (2014.01) |
| *G06Q 20/38* | (2012.01) |
| *G06Q 20/40* | (2012.01) |
| *H04L 9/32* | (2006.01) |

(52) U.S. Cl.
CPC ......... *A63F 13/792* (2014.09); *G06Q 20/382* (2013.01); *G06Q 20/389* (2013.01); *G06Q 20/401* (2013.01); *H04L 9/3213* (2013.01)

(58) Field of Classification Search
CPC .. A63F 13/792; G06Q 20/382; G06Q 20/389; G06Q 20/401; H04L 9/3213
See application file for complete search history.

(56) References Cited

U.S. PATENT DOCUMENTS

| | | | | | |
|---|---|---|---|---|---|
| 5,038,022 | A | * | 8/1991 | Lucero | G07F 7/025 463/40 |
| 5,265,874 | A | * | 11/1993 | Dickinson | A63F 3/081 902/23 |
| 5,336,870 | A | * | 8/1994 | Hughes | G07F 17/26 902/24 |
| 5,371,345 | A | * | 12/1994 | LeStrange | G07F 17/32 235/382 |
| 5,577,109 | A | * | 11/1996 | Stimson | G06Q 20/28 379/114.15 |

(Continued)

*Primary Examiner* — Steven J Hylinski

(57) ABSTRACT

A system and method(s) for tracking gaming payment-card transactions using a token is described. A method, for instance, includes initiating, via a player interface device, a payment-card transaction to purchase game credits for use at a gaming machine. The method further includes obtaining, from a payment terminal in response to initiating the payment-card transaction, a token that replaces sensitive payment-card information. The method further includes determining, in response to obtaining the token, a previous use of the token, via a gaming network, for previous payment-card transactions that occurred via the gaming network within a given period. The method further includes determining, in response to determination of the previous use of the token, whether a spending limit, for a player account associated with the token, would be exceeded by an amount of the payment-card transaction, and further presenting, via a display, an indication of whether the spending limit would be exceeded.

21 Claims, 9 Drawing Sheets

(56)  References Cited

U.S. PATENT DOCUMENTS

| | | | | |
|---|---|---|---|---|
| 5,902,983 | A * | 5/1999 | Crevelt | G07F 17/32 |
| | | | | 463/20 |
| 6,260,024 | B1 * | 7/2001 | Shkedy | G06Q 40/04 |
| | | | | 705/28 |
| 6,547,131 | B1 * | 4/2003 | Foodman | G06Q 20/04 |
| | | | | 902/23 |
| 6,629,591 | B1 * | 10/2003 | Griswold | G07F 1/06 |
| | | | | 463/25 |
| 7,267,614 | B1 * | 9/2007 | Jorasch | G07F 17/3251 |
| | | | | 463/25 |
| 7,419,428 | B2 * | 9/2008 | Rowe | G07F 17/3281 |
| | | | | 463/16 |
| 8,241,123 | B2 | 8/2012 | Kelly et al. | |
| 8,845,416 | B2 | 9/2014 | Schwartz | |
| 9,269,231 | B2 * | 2/2016 | Curtin | G07F 17/3237 |
| 9,454,752 | B2 * | 9/2016 | Berardi | G06Q 20/20 |
| 9,552,693 | B1 | 1/2017 | Reeves | |
| 9,666,027 | B2 | 5/2017 | York et al. | |
| 9,811,971 | B1 | 11/2017 | Reeves | |
| 9,928,502 | B2 | 3/2018 | York et al. | |
| 10,068,417 | B2 | 9/2018 | Toohey et al. | |
| 10,109,149 | B2 | 10/2018 | Reeves | |
| 10,573,129 | B2 | 2/2020 | Higgins et al. | |
| 10,643,431 | B2 | 5/2020 | Chesworth et al. | |
| 10,672,225 | B2 | 6/2020 | Reeves | |
| 11,069,187 | B2 | 7/2021 | Reeves | |
| 11,282,337 | B2 | 3/2022 | Warner et al. | |
| 2003/0134680 | A1 * | 7/2003 | Moik | G07F 7/1016 |
| | | | | 463/43 |
| 2008/0070690 | A1 * | 3/2008 | Van Luchene | G07F 17/32 |
| | | | | 463/42 |
| 2010/0093429 | A1 * | 4/2010 | Mattice | G07F 17/3232 |
| | | | | 463/25 |
| 2010/0174650 | A1 * | 7/2010 | Nonaka | G07F 17/32 |
| | | | | 705/44 |
| 2011/0077073 | A1 * | 3/2011 | Gagner | G07F 17/3255 |
| | | | | 463/25 |
| 2011/0086696 | A1 * | 4/2011 | MacEwan | G07F 17/32 |
| | | | | 463/43 |
| 2011/0183745 | A1 * | 7/2011 | Gagner | G07F 17/3286 |
| | | | | 463/25 |
| 2013/0065666 | A1 | 3/2013 | Schueller et al. | |
| 2013/0065686 | A1 | 3/2013 | Lemay et al. | |
| 2014/0256407 | A1 | 9/2014 | Graf et al. | |
| 2015/0199873 | A1 * | 7/2015 | Capps | G07F 17/329 |
| | | | | 463/25 |
| 2016/0042599 | A1 | 2/2016 | Toohey et al. | |
| 2017/0316640 | A1 | 11/2017 | Steil et al. | |
| 2019/0197830 | A1 * | 6/2019 | Petersen | G07F 17/3225 |
| 2020/0226881 | A1 * | 7/2020 | Warner | G07F 17/3241 |
| 2021/0082244 | A1 | 3/2021 | Schwartz | |
| 2021/0104118 | A1 * | 4/2021 | Schwartz | G06Q 20/18 |
| 2023/0177914 | A1 | 6/2023 | Jesudoss et al. | |

* cited by examiner

TRACKING GAMING PAYMENT-CARD TRANSACTIONS AND SPENDING LIMITS VIA TOKEN(S)

RELATED APPLICATIONS

This patent application claims priority benefit to U.S. Provisional Patent Application No. 63/410,646 filed Sep. 28, 2022. The 63/410,646 Application is hereby incorporated by reference herein in its entirety.

COPYRIGHT

FIELD

The present invention relates generally to apparatus and methods for cashless game funding, such as via payment card.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines as well as those machines, or systems, that are easy to use. Funding a gaming session for a gaming machine has typically been performed using a form of physical value, such as cash or physical vouchers. However, many patrons find value in being able to fund gaming sessions without the use of cash or physical vouchers, such as via the use of payment cards (e.g., debit cards, credit cards, etc.). Payment card usage, however, can result in overspending, hence player accounts can be set up with spending limits. However, usage of payment cards can often be difficult to track when used anonymously within a casino (i.e., without a player account). For example, to access and/or track sensitive payment-card information (e.g., primary account numbers (PANs) and/or personal identification numbers (PINs)) some regulatory standard groups (e.g., the Payment Card Industry Security Standards Counsel (PCI SSC), the Payment Application Data Security Standard (PA-DSS), etc.) can require strict regulatory security standards that may be onerous and/or cost-prohibitive for many businesses (including casinos) to meet. Therefore, there is a continuing need for wagering game machine manufacturers to continuously develop gaming features (e.g., innovative cashless tracking features) that will improve the gaming experience for players and that will protect players' interests regarding gaming spending limits, without requiring burdensome compliance requirements by casinos.

SUMMARY

According to an embodiment of the present disclosure, a system to initiate, in response to user input via a player interface device connected to a gaming machine and a gaming network, a payment-card transaction to purchase game credits for use at the gaming machine. The system can further obtain, from a payment terminal in response to initiation of the payment-card transaction, a token that replaces sensitive payment-card information from the payment-card transaction. The system can further determine, in response to obtaining the token, a previous use of the token, via the gaming network, for one or more additional payment-card transactions that occurred via the gaming network within a given period. The system can further determine, in response to determination of the previous use of the token, whether a spending limit, for a player account associated with the token, would be exceeded by an amount of the payment-card transaction. The system can further present, via a display, an indication of whether the spending limit would be exceeded.

Additional aspects of the invention will be apparent to those of ordinary skill in the art in view of the detailed description of various embodiments, which is made with reference to the drawings, a brief description of which is provided below.

Figure 1:
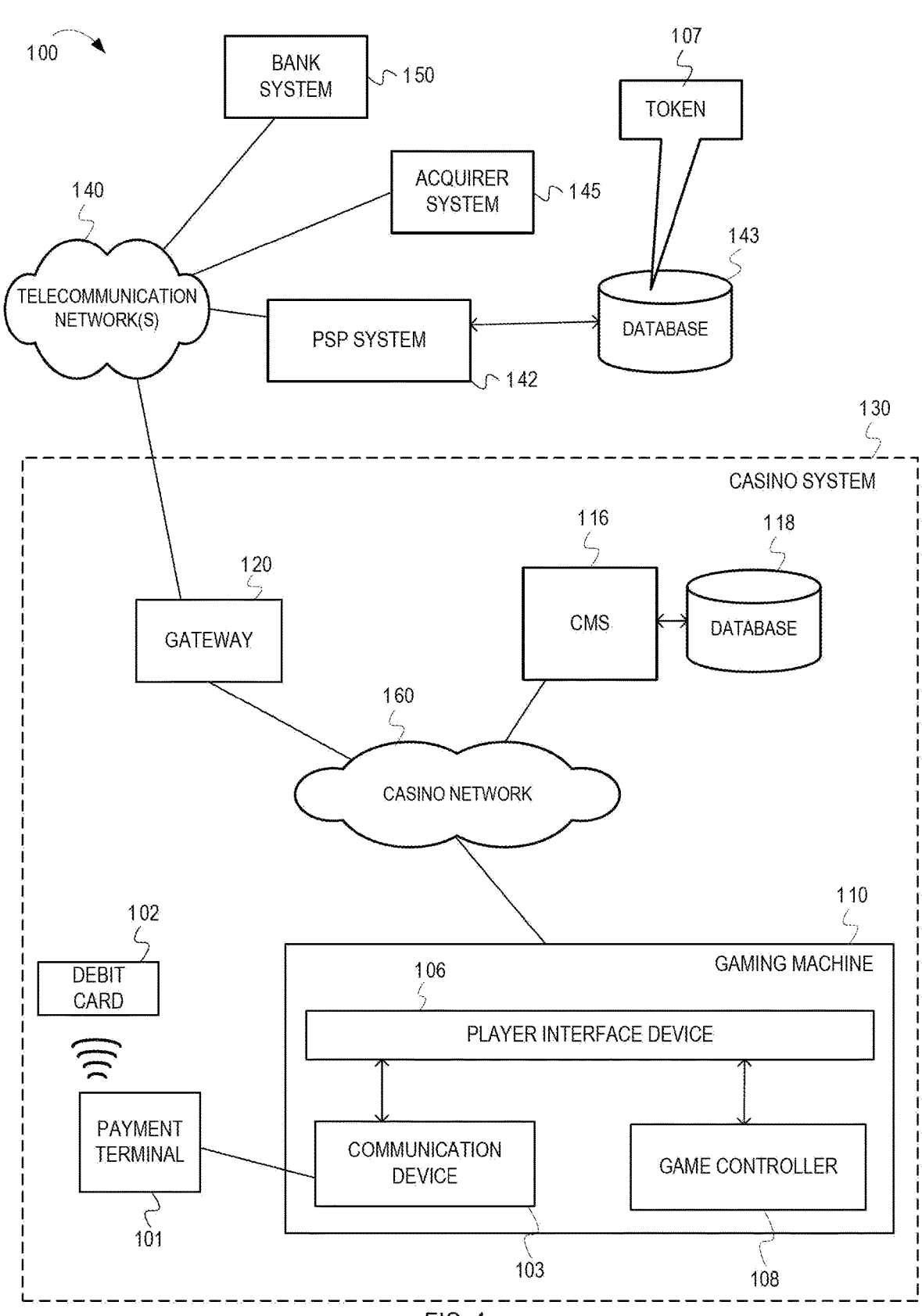
FIG. 1 is a diagram of an example network according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, at least some embodiments with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 is a diagram of an example network ("network 100") according to one or more embodiments of the present disclosure. The network 100 includes a bank system 150, an acquirer system 145, and a payment service provider (PSP) system 142 communicatively coupled (e.g., connected within the network 100) to each other via one or more telecommunication networks (i.e., "telecommunication network(s) 140"). In some embodiments, the telecommunication network(s) 140 include, but are not limited to, the Internet, a computer network, a cell phone communication network, etc. In one embodiment the acquirer system 145 is associated with a bank of a casino operator (e.g., a bank with which a casino operator has a bank account (e.g., the "casino's bank" or the "merchant bank")). In one embodiment, the bank system 150 is associated with (e.g., belongs to, is authorized by, etc.) a bank that issued a payment card (e.g., debit-card 102) being used by a player (i.e., the "issuer's bank" or the "player's personal bank"). In some embodiments, the bank system 150 is a combination of different third-party (e.g., non-casino) systems associated with one or more of the issuer of the card, a bank by which the card is paid, a bank that provides a bank account tied to the card (e.g., as in the case of payment-card transactions), etc. The various third-party systems authorize use of, and or access to, the PSP system 142, via authorized connections, subscriptions, devices (e.g., payment terminal 101), etc. A payment service provider (PSP) is a third-party (e.g., non-casino) company that assists businesses to accept a wide range of online payment methods, such as online banking, credit cards, debit cards, e-wallets, cash cards, etc. PSP's manufacture and provide payment terminals (e.g., payment terminal 101) that comply with the regulatory security standards, such as compliance with the Payment Card Industry Data Security Standard (PCI DSS), (i.e., also referred to a "PCI compliance"). In other words, the payment terminal 101 is PCI compliant to at least to some level of the PCI DSS (see FIG. 3, processing block 308 for more details regarding the payment terminal 101 and/or alternate embodiments associated with differing levels of PCI compliance). The payment terminal 101 may also be referred to as a Point-of-Sale (POS) terminal. The payment terminal 101 is authorized to communicate encrypted sensitive payment-card information with the PSP system 142.

The PSP system 142 is communicatively coupled to a gateway or proxy (e.g., gateway 120). The gateway 120 is communicatively coupled via a gaming network, (e.g., via casino network 160)) to a casino management system ("CMS") 116, which is communicatively coupled to the player interface device 106 (also via the casino network 160). The CMS 116 is authorized to perform transactions with, and/or to securely communicate with, the player interface device 106. The gateway 120 is also communicatively coupled (via the telecommunication network(s) 140) to the PSP system 142. The gateway 120 may be a server, a desktop computer, a laptop, a smartphone, a gaming machine, or other form of electronic device having one or more processors, a computer memory, an electronic communications system (e.g., a bus, a network interface device, a wireless communications device, etc.), etc. For instance, the gateway 120 may be the computer system 900 described in FIG. 9. In some embodiments, the gateway 120 is configured to receive instructions from the player interface device 106 and/or the CMS 116 pertaining to payment-card transactions. In some embodiments, some combination of one or more of the player interface device 106, the CMS 116, the database 118, and/or the gateway 120 may be collectively referred to as a "player tracking system," a "patron management system," a "cashless casino system," etc., or more generally as, or part of, the casino system 130. The CMS 116 provides (via the player interface device 106) "system-based content" and/or "system-based services." The system-based content and/or system-based services may include, but are not necessarily limited to, content related to player benefits, casino services, marketing bonuses, promotions, advertisements, beverage or dining services, or any other information that is relevant to the player's gaming experience other than the wagering game itself. Content for a wagering game may be referred to as game content. Game content, for instance, includes game assets of the wagering game, content related to a bet placed on the game (e.g., bet meters, pay tables, payout/collection, credit meters, number of lines selected for betting, an amount bet per line, a maximum bet, etc.), game play elements of the game (e.g., reels, indicia, game symbols), game instructions, etc. Examples of the CMS 116 include, but are not limited to, one or more of the ACSC Casino Management System™ product, the SDS™ slot-management product, the CMP™ player-tracking product, the Elite Bonusing Suite™ product, or the Bally Unified Wallet product, all available from Light & Wonder Inc.

In some embodiments, elements of the casino system 130, such as the gateway 120, the CMS 116, and/or player interface device 106 are configured, and/or authorized, to coordinate communications with the PSP system 142 to track a token (e.g., token 107) provided by the PSP system 142. The token 107 is used to track the payment-card transactions without needing to know sensitive payment-card information (e.g., primary account numbers (PANs), personal identification numbers (PINs), etc.). For example, the PSP system 142 provides the token 107 in place of (e.g., replaces) the sensitive payment-card information for use in communications and/or for storage in records associated with the payment-card transactions. The PSP system 142 generates and assigns the token 107 to a particular payment card (e.g., to debit card 102). The PSP system 142 stores the token 107 (also referred to as a "host" token) in a token vault, or other such database (e.g., database 143), and associates the token 107 with a payment-card identifier (e.g., with a PAN of the debit card 102). In some embodiments, the PSP system 142 may also be referred to as a tokenization system. The token can be any non-sensitive, surrogate value, or in other words a non-sensitive equivalent to a sensitive data element within the transaction data. For instance, in some embodiments, the token is a number and/or text string that is randomly generated and stored by the PSP system 142. In other embodiments, however, the token is any value that replaces the sensitive transaction data (e.g., sensitive card information) and which can be used as a local identifier for the card and/or as a reference for previous use of the card. For example, in some instances, instead of providing a randomly generated string, the PSP system 142 (or any other type of system that replaces sensitive information), can provide some information related to the user, card, account, etc., but is insufficient to determine (e.g., to compute, deduce, etc.) the original sensitive information. For example, the PSP system 142 (or any other similar type of merchant services provider), can provide, as a token (or other such replacement value) a portion of the sensitive data that is sufficient to be a unique identifier, but an insufficient amount from which to derive or deduce the sensitive information. For example, the PSP system 142 can provide, as a token, the first four digits and the last four digits of a PAN, along with an account holder's name. The first four digits and last four digits equate to only eight of the sixteen digits in the PAN. Hence, all sixteen digits would equate to sensitive payment-card information because all sixteen digits equate to the entire PAN. However, only eight digits (of the sixteen digit PAN) equates to an insufficient amount of information to derive or deduce the complete sixteen-digit value (eight digits are missing). Thus, the CMS 116 (or the player interface device 106) can use the provided eight digits of the PAN and the account holder's name to generate a unique identifier which can be used to locally identify the use of the payment card (e.g., the debit card 102) within the local gaming network (e.g., within the casino system 130). Thus, the word "token" as used herein encompasses any non-sensitive, transaction information provided by a merchant service provider (or merchant account provider) that can be used (in place of sensitive transaction information) by a device of a gaming network (e.g., a device of the casino system 130) to track a local (casino) use of a particular payment card via the gaming network, without exposing sensitive transaction data to the device of the gaming network. Tracking the local use of the payment card can include determining (e.g., via a search of transaction data stored on the gaming network) whether the token is associated with a previous use of the card via the gaming network, and whether a spending limit has been reached for the card. Based on whether the spending limit has been reached, notifications can be presented, use of the card can be restricted or limited, transactions can be terminated, etc.

The CMS 116 is configured to transmit authorization instructions to the player interface device 106 to fund a game controller 108 via funds transfer. The gateway 120 is configured to track and maintain a history for operations and transactions that occur via communications with devices or systems that are external to a casino system 130 (e.g., with the PSP system 142, the acquirer system 145, and/or the bank system 150) as well as with devices or systems that are internal to the casino system 130 (e.g., with the CMS 116, the database 118, a gaming machine 110, the player interface device 106, the game controller 108, etc.). In some embodiments, the CMS 116 can aggregate data related to transactions with the external devices/systems as well as transactions that occur by various devices of the casino system 130.

The payment terminal 101 is communicatively coupled to the player interface device 106 via a communication device 103. In one embodiment, the communication device 103 is a Universal Serial Bus (USB) connection device. In one example, the gaming machine 110 may be the gaming machine 810 described in FIG. 8, and, thus, the communication device 103 may be connected to the bus 848 of the gaming machine 810 via the external system interface 858 or as one of the input devices 850. In some embodiments, the payment terminal 101 is associated with a mobile device (e.g., as in the case of a virtual payment terminal). In some embodiments, the communication device 103 provides a wireless connection, such as a personal area network (WPAN) device configured to communicate via a short-range, wireless protocol (e.g., via Bluetooth® technology).

In one example, the communication device 103 is a Bluetooth Low Energy (BLE) device. In some examples, the communication device 103 includes a mobile (or wireless) card reader (e.g., a modular card reader) with wireless proximity sensing capabilities and that supports wireless Bluetooth™ type communications. In some embodiments, the communication device 103 is configured to connect (e.g., via wireless authentication) to a mobile device (e.g., a smartphone, a tablet, a personal mobile device, etc.) which is associated with a casino patron (i.e., with a player of the gaming machine 110). The mobile device may be configured to present a mobile application from which a registered patron can provide user input. The mobile application can communicate with the PSP system 142 and/or the player interface device 106 via an application programming interface (API) developed using a software development kit (SDK) (e.g., of the player interface device 106) for purposes of communication with the communication device 103. The communication device 103 is communicatively coupled to other devices within the gaming machine 110. For instance, in one embodiment, the communication device 103 is communicatively coupled to the player interface device 106 (e.g., via a USB connection device). In some embodiments, the communication device 103 communicates with the player interface device 106 via an encrypted communication channel.

In some embodiments, the player interface device 106 is communicatively coupled to the game controller 108 and is configured to communicate with the game controller 108. In some embodiments, the player interface device 106 can intercept an image feed of gaming content from the game controller 108 and rescale the gaming content to fit as a picture-in-picture within a player user interface that presents system-based content, such as content related specifically to a player account (such as customer loyalty benefit information, earned rewards points, player funds, promotions, bonus games, etc.). The player interface device 106 can also provide access to casino services such as electronic drink deliveries, ordering tickets to casino entertainment, redeeming rewards, etc. Further, in some embodiments, the player interface device 106 is configured to communicate with the gateway 120. In some embodiments, the player interface device 106 is an iView® player interface product by Light & Wonder, Inc. An example description of the iView® product can be found in U.S. Pat. No. 8,241,123 to Kelly et al., the entirety of which is hereby incorporated by reference. The gaming machine 110 also includes a game controller 108. Examples of various devices, including a gaming machine and/or pairing of a gaming machine to a wireless communication device, are described in detail in U.S. Pat. No. 10,643,431 to Chesworth et al., and/or U.S. patent Ser. No. 10/068,417 to Toohey et al. The U.S. Pat. No. 8,241,123 and U.S. patent Ser. No. 10/068,417, which are hereby incorporated by reference in their respective entireties.

The PSP system 142 stores and retrieves data pertaining to payment-card transactions in one or more databases (e.g., database 143). In at least one embodiment, the database 143 includes a "token vault," or rather a listing (e.g., a table in the database 143) that stores unique tokens (e.g., generated by the PSP system 142), which tokens are used to identify a particular payment card (e.g., a debit card, a credit card, etc.). The PSP system 142 reuses the unique token value each time a transaction is requested for the particular payment card to which the token is assigned or associated. In one or more embodiments, the database 143 also tracks data associated with each payment-card transaction ("payment-card transaction data"), such a payment-terminal identifier (e.g., for the payment terminal 101), sensitive payment-card information (e.g., for the used debit card 102), one or more tokens (e.g., token(s) that identify the debit card 102), monetary values of transactions (e.g., amounts of money requested to purchase game credits for the gaming machine 110), a date-and-time stamp for transactions, etc. In some embodiments, the transaction record also indicates a type of the transaction (e.g., crediting a gaming machine vs. other types of transactions) and a location associated with the transaction (e.g., a tag ID of the gaming machine 110, a GPS location, etc.).

The network 100 is configured to initiate, by one or more processors of the network 100, a payment-card transaction (also referred to as a "current" payment-card transaction) to purchase game credits for use at the gaming machine 110. The current payment-card transaction can be initiated, for instance, in response to detecting user input via the player interface device 106 (or via a display of the gaming machine 110 managed by the player interface device 106). The one or more processors of the network 100 further obtain a token (e.g. token 107) in response to initiating the current payment-card transaction. The token 107 is provided by the PSP system 142 in place of sensitive payment-card information. The one or more processors of the network 100 further determine, in response to obtaining the token 107, a previous use of the token 107, via the gaming network (e.g., via the casino network 160) for one or more additional ("past") payment-card transactions that occurred within a given period prior to the current payment-card transaction. In some embodiments, the one or more processors of the network 100 determine, based on the previous use of the token 107, whether a spending limit, for a player account associated with the token 107, would be exceeded by an amount of the payment-card transaction. The one or more processors of the network 100 further present, via a display (e.g., of the player interface device 106, of the gaming machine 110, etc.), an indication of whether the spending limit would be exceeded. The one or more processors of the network 100 further permit or rejects the payment-card transaction based on whether the spending limit would be exceeded. FIGS. 2, 3, 4, 5, 6 and 7 describe additional embodiments of using tokens to track payment-card transactions in association with player accounts (e.g., to store tokens in association with a player account identifier, to search tokens against past transaction records when no player account identifier is known, to authorize or reject amounts that would exceed gaming spending limits associated with the token(s) and/or player account identifier, etc.).

By storing and tracking tokens from the PSP system 142, the network 100 is able to provide a way for a player to use their payment card directly at the gaming machine 110 to purchase gaming credits and to automatically manage (e.g., allow or deny) payment-card transactions that may exceed spending limits, even if the player account is no longer logged into the player interface device 106. When the payment-card transaction is authorized (e.g., if no spending limit is exceeded), then the network 100 (e.g., via the player interface device 106 and/or the CMS 116) performs an electronic funds transfer from the player account (e.g., as managed by the CMS 116), to the game controller 108. For example, the player interface device 106 can control and communicate data (e.g., gaming credit information) directly to the game controller 108 via a Slot Accounting System (SAS) funds transfer, via a virtual Ticket-In-Ticket-Out (TITO) procedure, etc. For example, in one embodiment, the CMS 116 and/or the player interface device 106 use a protocol for electronic transfer of funds (referred to herein as "funds transfer") to add the amount of the payment-card transaction to a credit meter of the gaming machine 110. The protocol for the funds transfer includes, but is not limited to, the Advanced Funds Transfer (AFT) protocol or the Electronic Funds Transfer (EFT) protocol. AFT is a secure technology for transferring funds between a gaming machine (e.g., the gaming machine 110) and a casino accounting system (e.g., the CMS 116). AFT can be used to transfer funds associated with player tracking accounts (also referred to herein as "player loyalty accounts" or "player accounts").

The network 100 supports responsible gaming by automatically detecting (and enforcing) spending limits associated with a payment card in embodiments (e.g., see FIG. 3) where a player is logged into a player account (i.e., a "carded" player) and also in embodiments (e.g., see FIG. 6) where the player is not logged into a player account (i.e., an "uncarded" player or "anonymous" player). Furthermore, the network 100 provides direct purchase of game credits with a payment card using the payment terminal 101. The network 100 also protects a player's financial information to prevent unauthorized transactions, and removes any need to interact with an operator employee to fund the gaming machine 110. Furthermore, the network 100 tracks a spending limit for all payment-card transactions within a casino network, without requiring the casino operator to be a PCI compliant merchant. For example, at least some embodiments remove or reduce the need for PCI compliance. Because sensitive payment-card information is never exposed outside of the payment terminal 101, regulatory security standards are only needed to be met by the payment terminal 101 (which is hardened by the vendor to meet the regulatory security standards) and not by any of the other devices included in the casino system 130.

Figure 2:
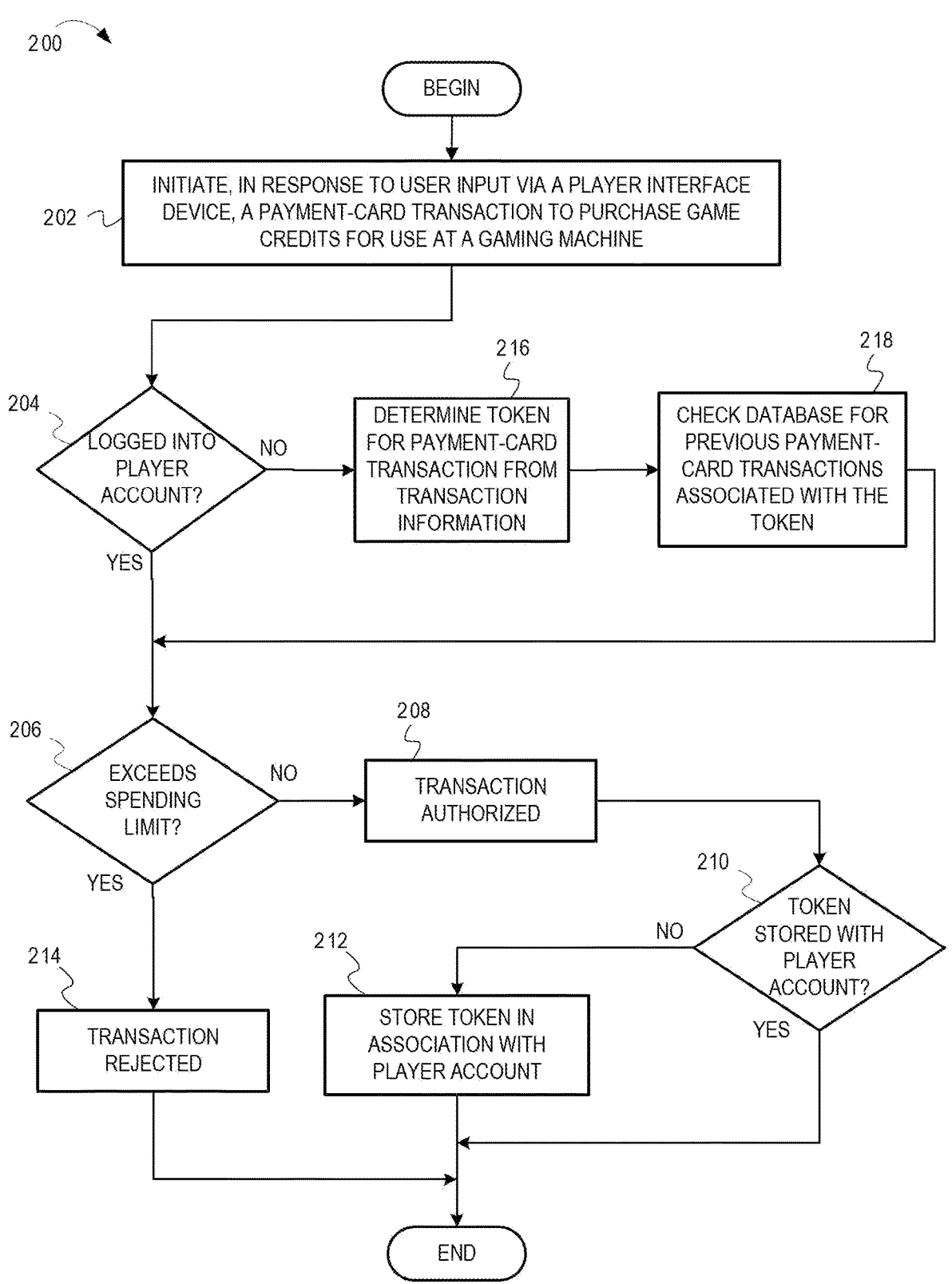
FIG. 2 illustrates an example of a method flow of automatically managing gaming payment-card transactions using at least one token in association with player accounts according to one or more embodiments of the present disclosure.

FIG. 2 illustrates an example of a method flow ("flow 200") of automatically managing payment-card transactions using one or more tokens according to one or more embodiments of the present disclosure. The description of FIG. 2 refers to a "processor" that performs operations associated with the flow 200. It should be noted that the reference to the processor may refer to the same physical processor or it may be one of a set of a plurality of processors. The set of processors may operate in conjunction with each other and may be distributed across various networked devices (e.g., across the network 100). The types of processors may include a central processing unit, a graphics processing unit, any combination of processors, etc. In one embodiment, the processor may be included in, or refer to, to one or more devices of the network 100, such as any one of the devices connected via the casino network 160 (e.g., gateway 120, CMS 116, gaming machine 110, player interface device 106, payment terminal 101, etc.) or any device connected via the telecommunications network 140 (e.g., the PSP system 142, the acquirer system 145, the bank system 150, etc.). In one embodiment, the processor may be the central processing unit (CPU) 842 (see FIG. 8) or a processor in another device mentioned herein, such as a processor associated with the computer 900, a table controller, a card-handling device, a camera controller, a game controller, a gaming server etc.

In FIG. 2, the flow 200 begins at processing block 202, where a processor initiates, in response to user input via a player interface device, a payment-card transaction to purchase game credits for use at a gaming machine. Some examples of initiating the payment-card transaction in response to user input are described in FIG. 3 (e.g., at processing block 301), FIG. 4 (screen 401), and FIG. 6 (at processing block 601) below.

Still referring to FIG. 2, the flow 200 continues at processing block 204, where a processor determines whether a player account is logged in via a gaming network. For example, the processor (e.g., of the player interface device 106) detects whether a player-account card (e.g., a player loyalty card) is inserted into a card-entry slot (or otherwise detected by a card reader) of the player interface device 106.

Referring still to FIG. 2, if, at processing block 204, the player account is not logged in, then the flow 200 continues at processing block 216, where the processor determines a token (i.e., a replacement value for the sensitive payment-card information). In one example, the processor determines the token by reading it from transaction data associated with the first payment-card transaction. For example, the processor reads, from the transaction information, a replacement value that was inserted into the transaction information by a payment service provider (e.g., from PSP system 142), or other entity authorized to access the sensitive data and replace the sensitive data with the replacement value. The replacement value is referred to herein as a token for sensitive payment-card information, or in other words, the token replaces the sensitive payment-card information (or replaces at some sufficient portion required by a compliance requirement and/or jurisdictional rule). Then, at processing block 218 the processor checks transaction records (e.g., stored on the database 118) for any previous payment-card transactions associated with the token (e.g., token 107). However, if, at processing block 204, the processor determines that the player account is logged in, then the flow 200 continues at processing block 206.

Figure 3:
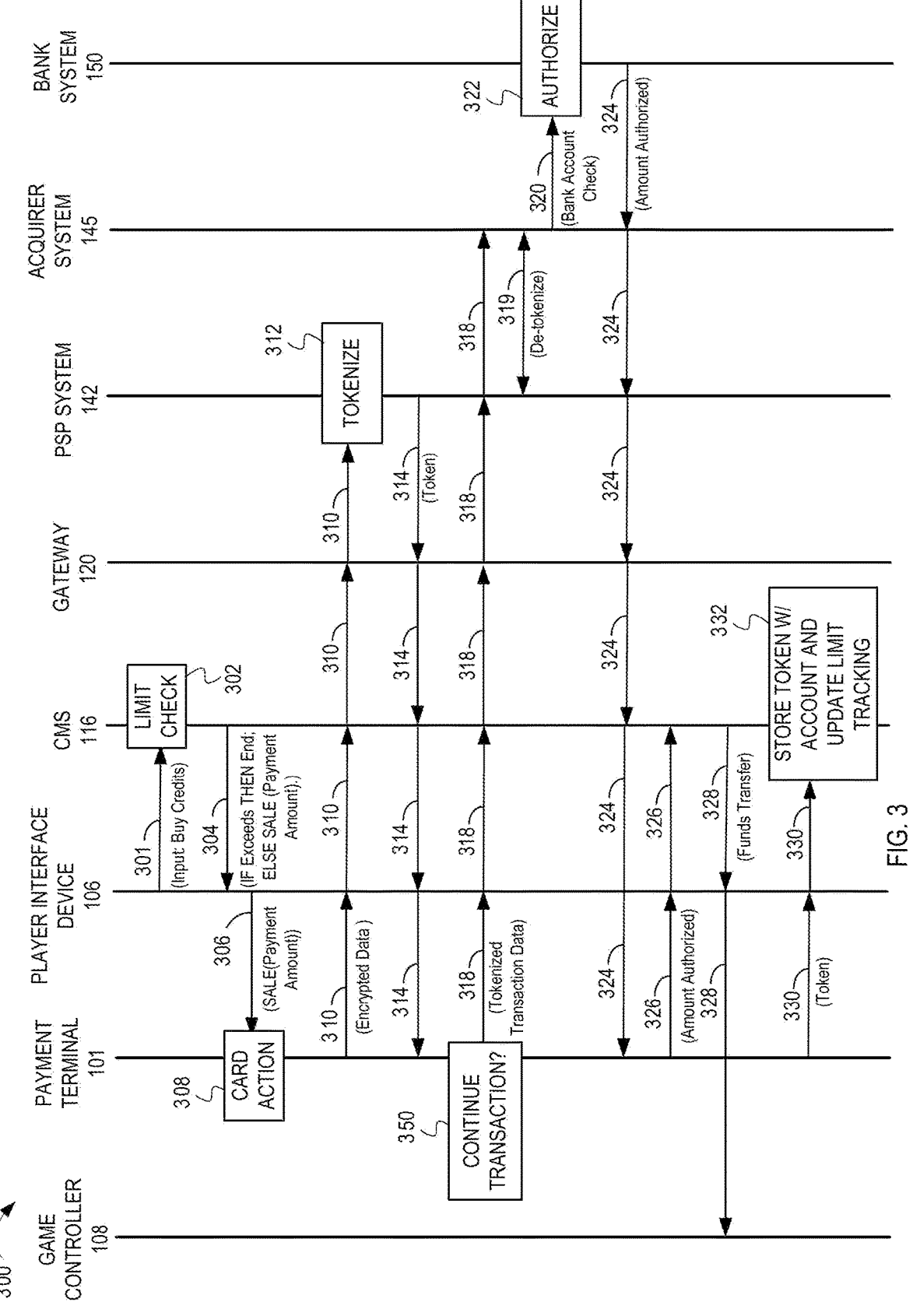
FIG. 3 illustrates an example data flow according to one or more embodiments of the present disclosure.
Figure 6:
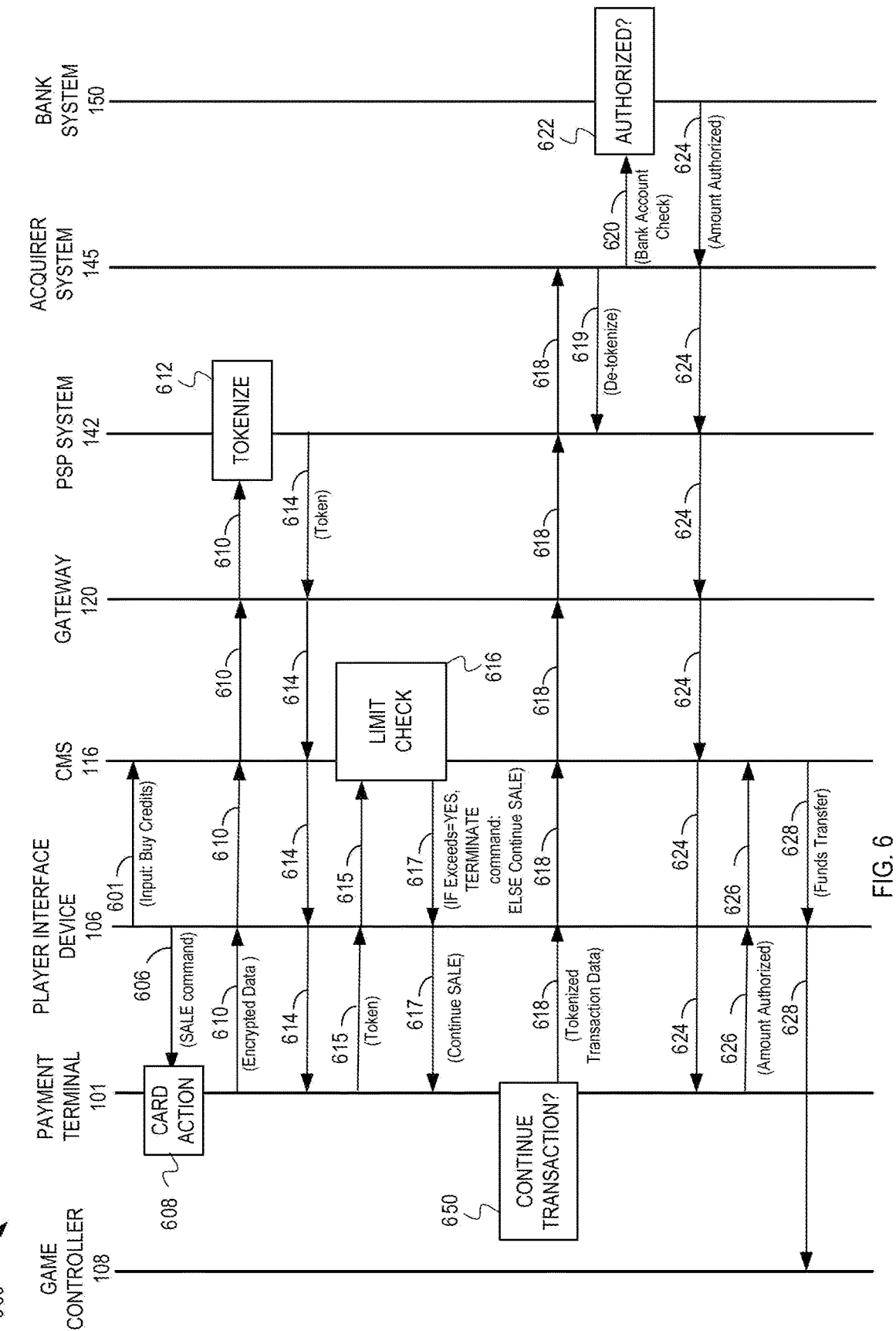
FIG. 6 is an example data flow according to one or more embodiments of the present disclosure.

At processing block 206, the processor determines whether the payment-card transaction would exceed a spending limit based on either a player account identifier (e.g., for a logged in player account) or based on the token (e.g., for when no player account is logged into). In some embodiments, spending limits for carded players (e.g., for players who have a player-account card inserted in the player interface device 106 and/or have otherwise logged into the player account via the player interface device 106) may be allowed higher spending limits than non-carded players. Hence, at processing block 206, the processor may access different spending limit settings depending on whether (at processing block 204) the processor had determined whether the player is logged into the player account. For instance, referring momentarily to FIG. 3, at processing block 302, a limit check is performed. However, the limit check at processing block 302 may utilize a different limit amount than the limit check at processing block 616 described in FIG. 6. Furthermore, the manner of determining whether an amount would exceed a spending limit can vary depending on the embodiment. For example, FIG. 3 illustrates an embodiment where the spending limit is checked differently than the embodiment shown in FIG. 6. For example, in FIG. 3 the limit check (302) can be performed by searching a data source(s) (e.g., a transactions databases, database 118, etc.) using, as a search parameter, the player account identifier from the logged in player account. In FIG. 6, however, the limit check (616) is performed without being able to first obtain the player account identifier from a logged in player account. Rather, the limit check (616) in FIG. 6 searches a data source(s) (e.g., database 118) using a token (e.g., token 107) as a parameter for a search of previous payment-card transaction records. The limit check (616) further includes finding, from the search of previous payment-card transaction records, at least one record from the database that indicates both the token and the player account identifier for the player account. In response to determining the relationship between the token and the player account identifier, the limit check (616) can also search the previous payment-card transaction records using either the player account identifier or the token (to ensure that all payment-card transactions are found, whether they occurred when the player was carded or non-carded). The limit check (616) further computes whether a total amount of past payment-card transactions summed with an amount of the current payment-card transaction would exceed a spending limit for a given period.

Referring again to FIG. 2, if at processing block 206, the processor determines that the spending limit is exceeded, then at processing block 214, the processor rejects the transaction. On the other hand, if, at processing block 206, the processor determines that the spending limit is not exceeded, then the flow 200 continues at processing block 208, where the processor authorizes continuation of the payment-card transaction and funds the gaming machine, via funds transfer on the casino network. For example, in some embodiments, in response to receiving the payment-card authorization, the processor (e.g., the CMS 116) generates and transmits a funding authorization to a player interface device (e.g., the player interface device 106). The player interface device is configured to control the funds transfer of the amount of monetary value to a game controller (e.g., game controller 108) of the gaming machine. In some embodiments, the processor is associated with a Slot Account System (SAS) host. In some embodiments, the funds transfer comprises one or more of an Advanced Fund Transfer (AFT) or an Electronic Funds Transfer (EFT).

In some embodiments the processor animates, via a display, information associated with the payment-card transaction, such as an indication of one or more of the amounts requested for purchasing game credits or the funding of the gaming machine. For example, the player interface device 106 (see FIG. 1) is configured to present (e.g., render, animate, etc.) an indication of the rejection or authorization of the payment-card transaction via a user interface and/or display of the player interface device 106. The processor can further transmit, via the player interface device 106, a completion message to the game controller 108 of the gaming machine 110. The game controller 108 is configured to increase a credit meter with a number of gaming credits equivalent to the amount of monetary value specified in the payment-card transaction.

Referring again to FIG. 2, the flow 200 continues at processing block 210 where the processor determines whether the token is already stored (or otherwise associated with) the player account. For example, if at processing block 204, the processor determines that a player account is logged into (e.g., a player account card is inserted into the player interface device 106), then the player account identifier is accessible to the processor. Thus, at processing block 212, the processor reads the player account identifier and stores the token is association with the player account identifier. For instance, the processor can store the token 107 (see FIG. 1) in the database 118 in association with a transaction record for the payment-card transaction, and also can write the player account identifier to the transaction record. In another example, the processor can store the token as an entry in a token list (in a token table) which is associated with the player account identifier (e.g., as a key in a relational database). FIGS. 3 and 6 are flow diagrams of additional embodiments. For example, FIG. 3 illustrates an example of storing and using tokens in association with a player account that is logged in. FIG. 6 illustrates an example of using a token without prior knowledge of a player account identifier and which determines, using the token as a search parameter, one or more previously recorded payment-card transactions that indicate the player account identifier.

Figure 4:
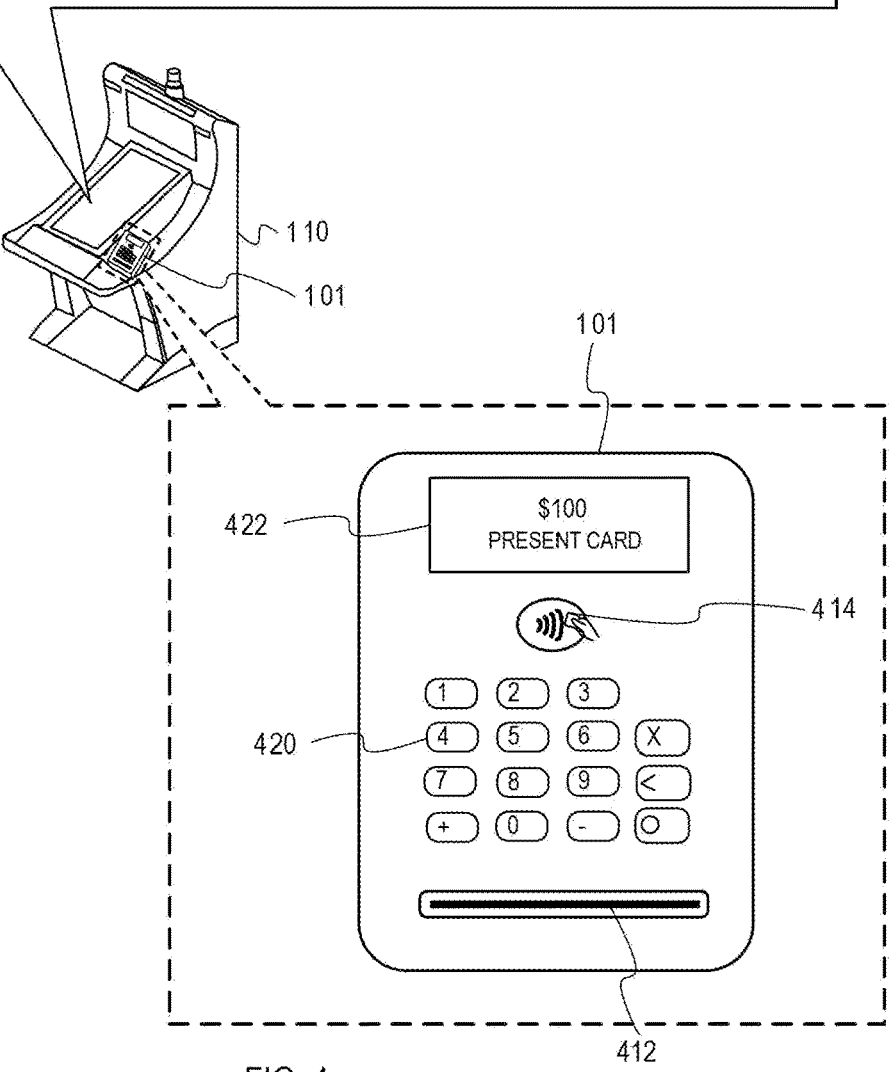
FIG. 4 is an illustration of managing gaming payment-card transactions using at least one token according to one or more embodiments of the present disclosure.
Figure 5:
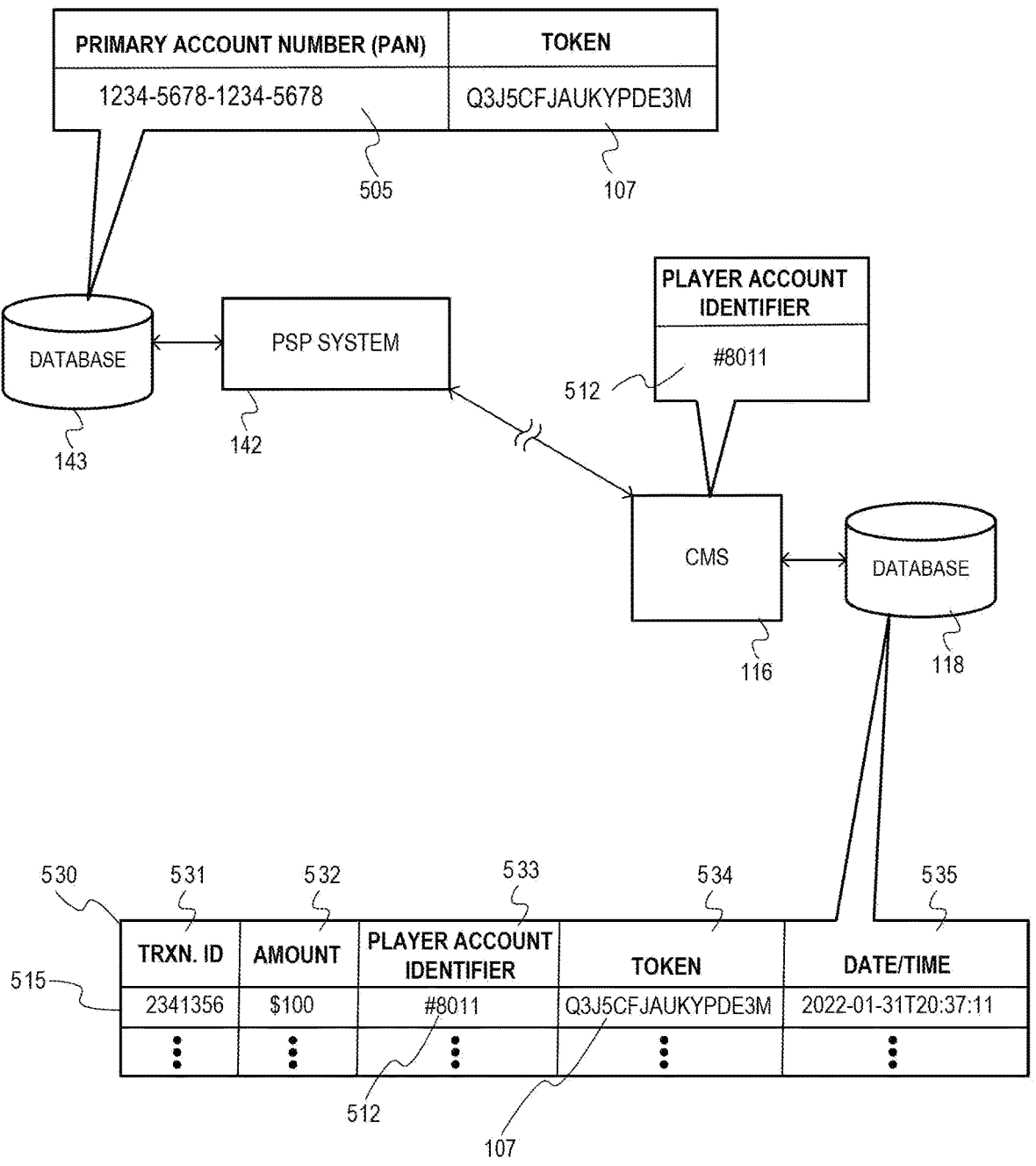
FIG. 5 is an illustration of managing gaming payment-card transactions using at least one token according to one or more embodiments of the present disclosure.

FIG. 3 illustrates an example data flow ("flow 300") according to one or more embodiments of the present disclosure. FIGS. 4 and 5 will be referenced in the description of FIG. 3. For ease of reference, some of the reference numerals from FIG. 1 are included in FIG. 3.

Referring to FIG. 3, the flow 300 begins at processing block 301 where the player interface device 106 receives user input from a player at the gaming machine 110 and communicates the input to the CMS 116. For example, the player enters the user input via a user interface of the player interface device 106. In one example, the player interface device 106 is an iVIEW4™ player interface device 106 or the iVIEW™ DM Display Manager device, both manufactured by Light & Wonder, Inc. For example, the DM Display Manager includes functionality to mix and scale video content for game content of the gaming machine 110 as well as system-based content for the player interface device 106. In FIG. 4, the player interface device 106 presents, via a display, a screen 401 to begin a payment-card transaction. The screen 401 includes instructions to select an input control (e.g., one of the buttons 405) to select an amount of credit to purchase for use at the gaming machine 110. For example, the player interface device 106 detects a selection of the button for "$100." Selection of one of the buttons 405 initiates a first payment-card transaction for a given amount of money equivalent to the value indicated on the selected button. The player interface device 106 further determines whether the player is logged into a player account. In the example of FIG. 3, the player is logged into the player account, such as via a login procedure that includes inserting a player account card into the player interface device 106 (i.e., the player is a carded player). The player interface device 106 access a player account stored in association with the CMS 116 (such as a player account stored in a table of the database 118).

Referring again to FIG. 3, the flow 300 continues at processing block 302 where, in response to determining that the player account is logged in (e.g., via the player interface device 106), the CMS 116 performs a limit check for the player account based on a requested amount of the first payment-card transaction (i.e., for the debit-card transaction initiated via the screen 401). For instance, the player interface device 106 transmits to the CMS 116 an instruction to perform a limit check. In one embodiment, the CMS 116 searches though the casino and/or player data sources to determine what are the spending limits to which the player account is subject. The CMS 116 can access the player account identifier (e.g., player account identifier 512) via access to the logged-in player account. The CMS 116 examines settings (within the player account or elsewhere) that indicate spending limits and ensures, for instance, that (a) the first payment-card transaction is not attempting to exceed a casino-wide daily limit and (b) the first payment-card transaction is not attempting to exceed any daily limit that the player has set or that other authorized users have previously set for the player (e.g., using a player interface device, such as player interface device 106). If any of these limits have been reached, the CMS 116 rejects the transaction, and the player is informed (e.g., via the screen 401). To determine whether the spending limit is reached, the CMS 116 can search through the database 118 (or any other such database or data source). The data source(s) contain a storage of payment-card transaction records. The CMS 116, thus, can search the database 118 (or other such sources) to detect the player account identifier 512 which was added to the payment-card transaction records when the payment-card transactions were performed (when the player account was logged in). In other embodiments, the CMS 116 tracks payment-card transactions for the player account as they occur and creates a running total of the transaction amounts for any given spending limits (e.g., casino-wide or personal spending limits). Thus, the CMS 116 can compare the requested amount of the first payment-card transaction to the running total to determine whether the requested amount would exceed any given spending limits. Some spending limits may also be imposed on the transaction by the player's bank (e.g., via the bank system 150). Those spending limits may be tracked by the player's bank and may cause the transaction to be rejected at a later stage.

The flow 300 continues at processing block 304 where the CMS 116 notifies the player interface device 106 that the detected spending limits are not exceeded for the amount of the first payment-card transaction. For example, as shown in FIG. 4, the screen 401 further includes instructions to follow prompts on the payment terminal 411. In some embodiments, the instructions to follow prompts on the payment terminal 411 are not presented until the limit check 302 is performed and verified as not being exceeded.

If, at processing block 304 the CMS 116 permits the first payment-card transaction to continue (i.e., the limit check passed), then the flow 300 continues at processing block 306 where the requested amount of credit to purchase is passed to the payment terminal 101 and interaction with the payment terminal 101 begins. For example, the player interface device 106 passes the requested amount to the payment device in a 'Sale' command.

The flow 300 continues at processing block 308 where the payment terminal 101 detects a card action. For instance, as shown in FIG. 4, the payment terminal 101 has input controls with which the player may interact. For example, in one embodiment, the payment terminal 101 includes a payment-card reader (e.g., a magnetic card reader 412, a wireless card reader 414, etc.), a keypad 420 (e.g., for entry of a dollar amount and/or a PIN), and a display 422 (e.g., to display amounts, instructions, prompts, or other information). The payment-card reader (e.g., the magnetic card reader 412, the wireless card reader 414, etc.) detects an action (e.g., insertion, dip, tap, etc.) of the payment card (e.g., debit card 102). The keypad 420 receives a user-input entry of a PIN as necessary. In one embodiment, the payment terminal 101 includes elements (e.g., hardware and/or software) to securely encrypt/decrypt and communicate sensitive payment-card information to and from the PSP system 142 without requiring the casino system 100 to meet specific regulatory security standards (e.g., PCI compliance standards). For instance, in one example, the payment terminal 101 is fully compliant with all levels of PCI regulatory security standards, such as the Unified Semi-Integrated (Unified-SI) payment product available from Ingenico Corporation. In other embodiments, however, the payment terminal 101 can have different (e.g., fewer) elements based on a lower regulatory security standard. For instance, the player interface device 106 can be configured to include elements that meet certain levels of PCI compliance (e.g., lower levels of compliance requirements). For example, PCI compliance requirements can have varying levels, such as the PCI DSS Merchant Compliance Levels which have at least four levels of different compliance requirements for different types of merchants. In some embodiments, a device can be used at a gaming machine which meets a lower level of regulatory compliance, but which is not a stringent as other, higher levels of regulatory compliance. For instance the PCI Software-based PIN Entry on Commercial-off-the-shelf ("SPoC") Standard provides requirements for payment terminals that enable EMV® ("Europay, Mastercard, and Visa" Standards) contact and contactless transactions using a separate Secure Card Reader for PIN (SCRP) provided by an authorized vendor. In some embodiments, the SCRP can be used to read the payment card. The PIN entry (or other transaction operations) can occur on a casino device (e.g., the player interface device 106) using a secure PIN entry application. For example, a player interface device can use the SPoC Standard and can include a secure PIN entry application to obtain the player's PIN via an input device (e.g., a display, keypad, etc. of the player interface device). The input device can also be used to enter data about the payment-card transaction, such as a monetary amount. The SCRP can be attached to a cabinet (or housing) of a gaming machine or the SCRP and can be communicatively coupled to the player interface device (e.g., via Universal Serial Bus or USB). The player interface device can pass the PIN value to the SCRP using the secure PIN entry application. The SCRP device can be used by the player to read (e.g., via tap, dip, swipe, etc.) the payment card.

Still referring to FIG. 3, the flow 300 continues at processing block 310, where the payment terminal 101 encrypts first payment-card transaction data and transmits it to the PSP system 142. For example, in response to detecting the card action (308) (and in response to receiving the PIN value), the payment terminal 101 encrypts the first payment-card transaction data (including the sensitive payment-card information) and communicates it to the PSP system 142 (e.g., via the player interface device 106, the CMS 116, and the gateway 120). Thus, the encrypted data remains secure as it passes from the payment terminal 101 through the player interface device 106, the CMS 116, and the gateway 120 en route to the PSP system 142. This ensures that neither the player interface device 106, the gaming machine 110, the gateway 120, nor the CMS 116 ever has access to the sensitive payment-card information, such as PANs or PINs. In one embodiment, the gateway 120 is a firewalled, limited private connection through the Internet to the PSP system 142.

The flow 300 continues at processing block 312 where the PSP system 142 tokenizes the encrypted data. For instance, the PSP system 142 decrypts the encrypted data and replaces the sensitive payment-card information with the token 107. Referring to FIG. 5, the PSP system 142 accesses records (e.g., the token vault) within the database 143 that relate a primary account number 505 for the debit card 102 to the token 107. In one example, such as for the first time the debit card 102 is used, the PSP system 142 (e.g., via tokenization) generates a random 16-character alphanumeric string (e.g., "Q3J5CFJAUKYPDE3M"), and uses the string as the token 107. The PSP system 142 records the correlation between the primary account number 505 and the token 107 in the token vault. The PSP system 142 can re-use the token 107 (e.g., for a certain amount of time or until replaced for other policy reasons). Hence, the token 107 can be referred to (e.g., by the CMS 116 and/or the player interface device 106) as a reference to determine amounts that are requested within a given period.

The flow 300 continues at processing block 314 where the PSP system 142 sends the token 107 back to the payment terminal 101 (e.g., via the gateway 120, the CMS 116, and the player interface device 106).

At processing block 350, the payment terminal 101 determines whether to complete the payment-card transaction. For example, after detecting the card action, at processing block 308, the payment terminal 101 pauses, for example, until certain continuation conditions are satisfied. For example, the payment terminal 101 waits until a replacement value (e.g., token 107) is determined (e.g., received from the PSP system 142) for the sensitive payment-card data. In some embodiments, the payment terminal 101 can, at processing block 350, also assess additional continuation conditions, such as whether an additional user input is received (e.g., a user-input confirmation via the payment terminal 101) and/or until data input is received (e.g., a limit check confirmation from the player interface device 106 and/or CMS 116).

The flow 300 continues at processing block 318 where the payment terminal 101 sends tokenized payment-card transaction data to the acquirer system 145. For example, the payment terminal 101 packages and transmits the portion of the payment-card transaction data that was not sensitive information (e.g., the requested amount) along with the token 107. The data sent by the payment terminal 101 to the acquirer system 145 may be referred to as "tokenized transaction data."

At processing block 319, the acquirer system 145 receives the tokenized transaction data (e.g., via the player interface device 106, the CMS 116, the gateway 120, and the PSP system 142) and de-tokenizes the tokenized transaction data (e.g., via communication with the PSP system 142), to determine any necessary information based on the token 107, such as the primary account number 505 of the debit card 102.

At processing block 320, after de-tokenizing the tokenized transaction data, the acquirer system 145 performs a bank account check. For instance, the acquirer system 145 communicates, via the telecommunications network(s) 140 with the bank system 150 (which has access to the player's bank account associated with primary account number 505 of the debit card 102).

At processing block 322, the bank system 150 authorizes the requested amount of the first payment-card transaction if the player's bank account has sufficient funds to cover the requested amount. If the player's bank account has insufficient funds, the bank system 150 would reject the completion of the first payment-card transaction.

At processing block 324, the bank system 150 communicates the authorization to the payment terminal 101. The authorization includes all necessary information to complete the first payment-card transaction, such as the requested amount, the token 107, etc.

The flow 300 continues at processing block 326 where the payment terminal 101 communicates to the player interface device 106 the authorized amount for the first payment-card transaction, and the player interface device 106 in turn informs the CMS 116.

The flow 300 continues at processing block 328 where the CMS 116 (via the player interface device 106) sends a funds transfer command (e.g., Slot-Account-System (SAS), virtual Ticket-In-Ticket-Out (TITO), etc.) to the game controller 108 to add gaming credits, for the requested amount, to a credit meter of the gaming machine 110. Once complete, the game controller 108 then transmits a transfer completion response. For instance, in response to receiving the one or more funds transfer commands, the game controller 108 adds a number of cashable credits to the credit meter of the gaming machine 110. Furthermore, the player interface device 106 can print (via a ticket printer at the gaming machine 110) a transaction receipt. In other embodiments, the CMS 116 can send an email of the receipt to an email address associated with the player account.

Referring back to FIG. 3, the flow 300 continues at processing block 330, where the payment terminal 101 provides the token 107 to the CMS 116 (via the player interface device 106). In another embodiment, the CMS 116 and/or player interface device 106 can obtain or detect the token 107 during any of communications at processing blocks 314, 318, 324, or 326.

The flow 300 continues at processing block 332 where, in response to obtaining or detecting the token 107, the CMS 116 stores the token 107 with the logged-in player account. For example, the CMS 116 obtains the player account identifier from the player interface device 106. The CMS 116 uses the player account identifier to associate the token 107 with the player account (if not already done so). For instance, in FIG. 5, the CMS 116 detects the player account identifier 512 (from the carded session of the player interface device 106), and stores, in the database 118, the token 107 in association with a record 515 for the first payment-card transaction. For instance, the database 118 includes a table 530 of transactions. The table 530 includes columns for at least some of the data elements of the table 530. The data elements includes a transaction identifier column 531 (i.e., an identifier for the transaction record), an amount column 532 (i.e., the requested amount of the payment-card transaction), a player account identifier column 533 (i.e., to identify the player account associated with the transaction), a token column 534 (i.e., to identify the token 107 used for the payment-card transaction), and a date/time stamp column 535 (i.e., to mark the date/time of the transaction). The data in the table 530 will be referred to again in FIG. 6, for instance to analyze past payment-card transactions within a given period against a spending limit (e.g., see FIG. 6, limit check at processing block 616).

Figure 7:
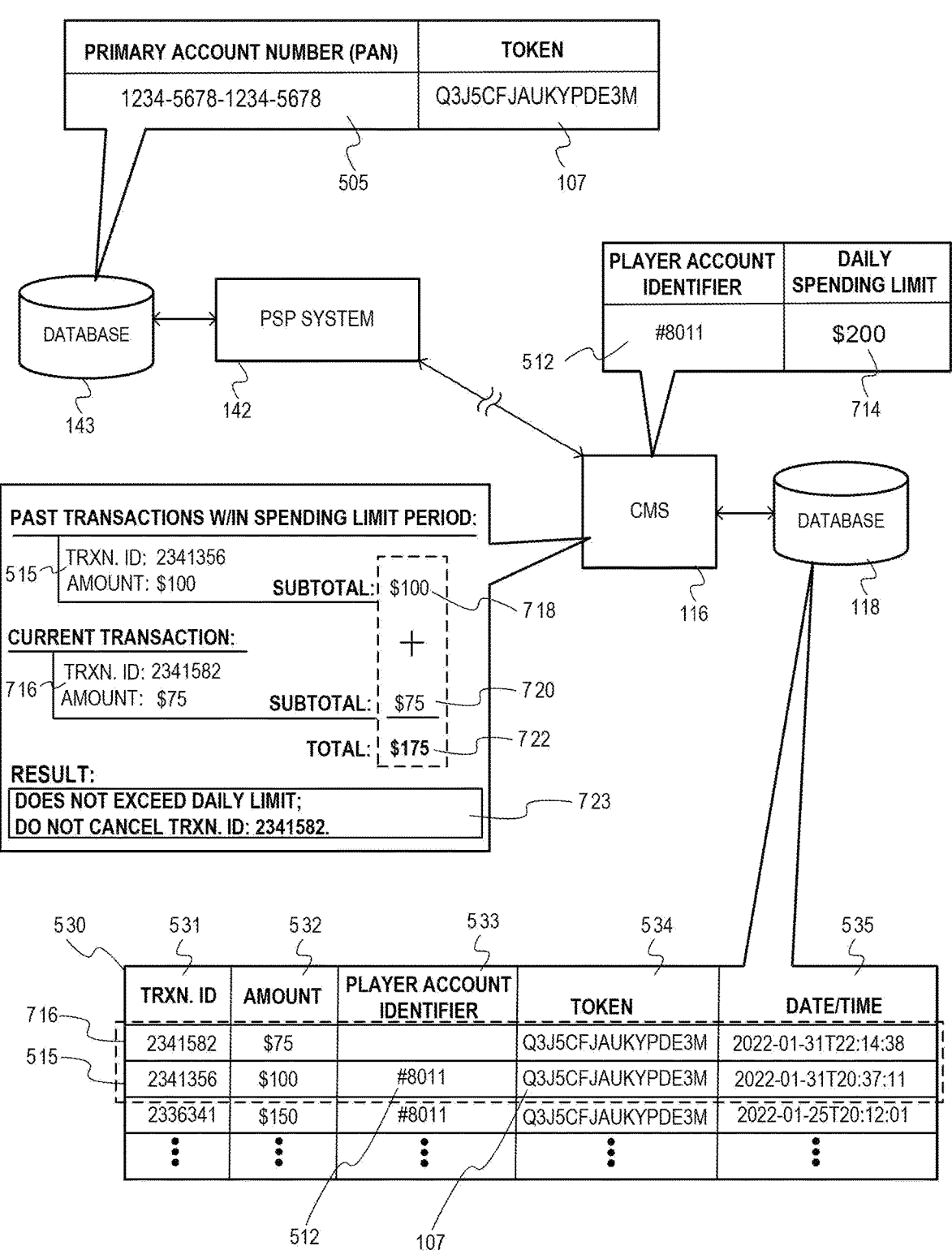
FIG. 7 is an illustration of managing gaming payment-card transactions using at least one token according to one or more embodiments of the present disclosure.

FIG. 6 illustrates an example data flow ("flow 600") according to one or more embodiments of the present disclosure. FIG. 7 will be referenced in the description of FIG. 6. For ease of reference, some the reference numerals from FIG. 1 are included in FIG. 6. In addition, FIG. 6 refers to a "second" payment-card transaction, in contrast to the "first" payment-card transaction described in FIG. 3. The second payment-card transaction occurs after the first payment-card transaction. In FIG. 6, the first payment-card transaction may also be referred to as at least one of one or more "past" payment-card transactions, as it occurred prior to the second payment-card transaction. In addition, as described in FIG. 6, the second payment-card transaction may also be referred to as the "current" payment-card transaction. Furthermore, for simplicity, FIG. 6 describes operations that are performed via the same devices (e.g., the same gaming machine 110, player interface device 106, payment terminal 101, etc.) as described in FIG. 3. However, in other embodiments, the operations of FIG. 6 can instead be performed at a different gaming machine, using a different player interface device and a different payment terminal, so long as they are also connected to the CMS 116 via the casino network 160. Hence, the second payment-card transaction can occur at the different gaming machine, yet still be able to access the database 118 via the CMS 116 to perform the operations mentioned in FIG. 6.

Referring to FIG. 6, the flow 600 begins at processing block 601 where the player interface device 106 receives user input from a player at the gaming machine 110. The player may enter the user input as similarly described in FIG. 4. For instance, selection of one of the buttons 405 initiates the second payment-card transaction for a given amount of money to purchase game credits for use at the gaming machine 110. The player interface device 106 further determines whether the player is logged into a player account. In the example of FIG. 6, the player is not logged into the player account (e.g., the player has not inserted a player-account card into the player interface device 106, is a non-carded player).

The flow 600 continues at processing block 606, where the player interface device 106 requests the payment terminal to initiate the second payment-card transaction. In some embodiments, the player interface device 106 can issue to the payment terminal 101 a "Get Token" command as opposed to the "Sale" command mentioned previously (at processing block 301). In some embodiments, the player interface device 106 can submit a "Sale" command to initiate the second payment-card transaction, but the CMS 116 can later terminate and/or roll-back the second payment-card transaction if, for instance, limit check (616) detects that the amount of the second payment-card transaction would exceed a spending limit.

The flow 600 continues at processing block 608 where the payment terminal 101 detects a card action. For instance, the payment terminal 101 can detect the card action as described in FIG. 4. The same payment card (e.g., debit card 102) is used for the first payment-card transaction as for the second payment-card transaction.

The flow 600 continues at processing block 610, where the payment terminal 101 encrypts the second payment-card transaction data and transmits it to the PSP system 142. For example, in response to detecting the card action (608) (and in response to receiving the PIN value), the payment terminal 101 encrypts the second payment-card information and communicates it to the PSP system 142 (e.g., via the player interface device 106, the CMS 116, and the gateway 120). The encrypted data remains secure as it passes from the payment terminal 101 through the player interface device 106, the CMS 116, and the gateway 120 en route to the PSP system 142.

The flow 600 continues at processing block 612 where the PSP system 142 tokenizes the encrypted payment-card transaction data. For instance, the PSP system 142 decrypts the encrypted payment-card transaction data and replaces the sensitive payment-card information with the token 107. Referring to FIG. 7, the PSP system 142 accesses records (e.g., the token vault) within the database 143 that relate the primary account number 505 for the debit card 102 to the token 107. The PSP system 142 detects the previously recorded correlation between the primary account number 505 and the token 107 in the token vault. The PSP system 142 re-uses (e.g., copies) the token 107.

The flow 600 continues at processing block 614 where the PSP system 142 sends the token 107 back to the payment terminal 101 (e.g., via the gateway 120, the CMS 116, and the player interface device 106).

The flow 600 continues at processing block 615, where the payment terminal 101 provides the token 107 to the CMS 116 (e.g., via the connection with player interface device 106). In other embodiments, the CMS 116 (and/or the player interface device 106) intercepts the token 107 at processing block 614.

The flow 600 continues at processing block 616 where, in response to determining that the player account is not logged into the player account, the CMS 116 performs a limit check 616 for the player account based on the requested amount of the second payment-card transaction. For instance, as shown in FIG. 7, the CMS 116 generates a new record 716 (and/or stores information in a transaction log), to track the second payment-card transaction (i.e., the "current" payment-card transaction). The CMS 116 determines, in response to obtaining the token 107, a previous use of the token 107, via the casino network 160, for one or more additional ("past") payment-card transactions that occurred within a given period. For example, the CMS 116 searches though the database 118 using the token 107 as a search parameter. The CMS 116 detects at least one record, such as the record 515, to which the token 107 is associated, having been written to the record 515 during the first payment-card transaction.

The CMS 116 further determines the player account identifier 512 based on the search of the database 118. For example, the CMS 116 detects that the player account identifier 512 is associated with the record 515, having been written to the record 515 during the first payment-card transaction (when the player account was logged in).

The CMS 116 further detects a spending-limit period by searching through casino and/or player account records for indicated spending limits associated with a payment card. For instance, as shown in FIG. 7, the CMS 116 determines that player account identifier 512 has a setting 714 for a spending limit. The setting 714 for the spending indicates a maximum spending-limit amount (e.g., "$200") and a set period of time for the spending limit (e.g., a "daily" spending limit). The spending-limit amount and the spending-limit period can vary based on the player account and/or casino requirements.

The CMS 116 further searches the database 118 (e.g., table 530) using, as search parameters, (a) one or more of the token 107 or the player account identifier 512 (which was determined to be associated with the token 107), and (b) time stamps within the spending-limit period. For example, the CMS 116 detects that two records, the record 515 and record 716 (for the current payment-card transaction), both occur within the spending-limit period (e.g., both occurred within the "daily" period indicated by the setting 714, or rather, on the same day). The CMS 116 can combine all the past payment-card transaction amounts into a first sub-total 718 (e.g., the record 515 indicates that a previous amount of $100 was transacted via the first payment-card transaction). Furthermore, the CMS 116 uses the amount of the current transaction (e.g., for record 716) as a second subtotal 720. The CMS 116 then adds the two subtotals to determine whether the total amount 722 would exceed the spending-limit amount. Based on the total amount 722, the CMS 116 determines a result 723. If the spending limit is not exceeded, the result 723 permits the second payment-card transaction to continue (as illustrated in FIG. 7). On the other hand, if the spending limit would have been exceeded, the result 723 would have either canceled the second payment-card transaction or reduced the requested value to a lesser amount that would not exceed the daily limit.

The flow 600 continues at processing block 617 where the CMS 116 notifies the payment terminal 101 (via the player interface device 106) that the detected spending limits are not exceeded for the amount of the current payment-card transaction. In one embodiment, the player interface device 106 generates a specific command, such as "Sale" command (as opposed to a "Get Token" command mentioned at processing block 606). In other embodiments, the player interface device 106 can permit a "Sale" command to continue. For example, if, at processing block 616, the CMS 116 determines that the spending limit has not been exceeded, the CMS 116 transmits an instruction to continue the payment-card transaction initiated by the original "Sale" command (e.g., see processing block 606). If, however, the CMS 116 determines that the spending limit was exceeded, the CMS 116 transmits a command to "Terminate" the payment-card transaction.

At processing block 650, the payment terminal 101 determines whether to continue the second payment-card transaction. For example, after detecting the card action, at processing block 608, the payment terminal 101 pauses, for example, until certain continuation conditions are satisfied. For example, the payment terminal 101 waits until the replacement value for the sensitive payment-card data is determined (e.g., until the token is received from the PSP system 142). In some embodiments, the payment terminal 101 can, at processing block 650, also assess additional continuation conditions, such as whether an additional user input is received (e.g., a user-input confirmation via the payment terminal 101) and/or until data input is received (e.g., a limit check confirmation from the player interface device 106 and/or CMS 116). For example, the payment terminal 101 can determine, in response to receiving the instruction from the CMS 116 (at 617), to continue the second payment-card transaction.

The flow 600 continues at processing block 618 where payment terminal 101 sends tokenized payment-card transaction data to the acquirer system 145. For example, the payment terminal 101 packages and transmits the portion of the second payment-card transaction data that was not sensitive payment-card information (e.g., the requested amount) along with the received token 107.

At processing block 619, the acquirer system 145 receives the tokenized transaction data (e.g., via the player interface device 106, the CMS 116, the gateway 120, and the PSP system 142) and de-tokenizes the tokenized transaction data (e.g., via communication with the PSP system 142), to determine any necessary information based on the token 107, such as the primary account number 505 of the debit card 102.

At processing block 620, after de-tokenizing the tokenized transaction data, the acquirer system 145 performs a bank account check. For instance, the acquirer system 145 communicates, via the telecommunications network(s) 140 with the bank system 150.

At processing block 622, the bank system 150 authorizes the requested amount of the second payment-card transaction if the player's bank account has sufficient funds to cover the requested amount. If the player's bank account has insufficient funds, the bank system 150 would reject the completion of the second-payment card transaction.

At processing block 624, the bank system 150 communicates the authorization to the payment terminal 101. The authorization includes all necessary information to complete the second payment-card transaction, such as the requested amount, the token 107, etc.

The flow 600 continues at processing block 626 where the payment terminal 101 communicates to the player interface device 106 the authorized amount for the second (i.e., the "current") payment-card transaction, and the player interface device 106 in turn informs the CMS 116.

The flow 600 continues at processing block 628 where the CMS 116 (via the player interface device 106) sends a funds transfer command (e.g., Slot-Account-System (SAS), virtual Ticket-In-Ticket-Out (TITO), etc.) to the game controller 108 to add gaming credits, for the requested amount, to a credit meter of the gaming machine 110. Once complete, the game controller 108 then transmits a transfer completion response. For instance, in response to receiving the one or more funds transfer commands, the game controller 108 adds a number of cashable credits to the credit meter of the gaming machine 110. Furthermore, the player interface device 106 can print or email a transaction receipt.

Figure 8:
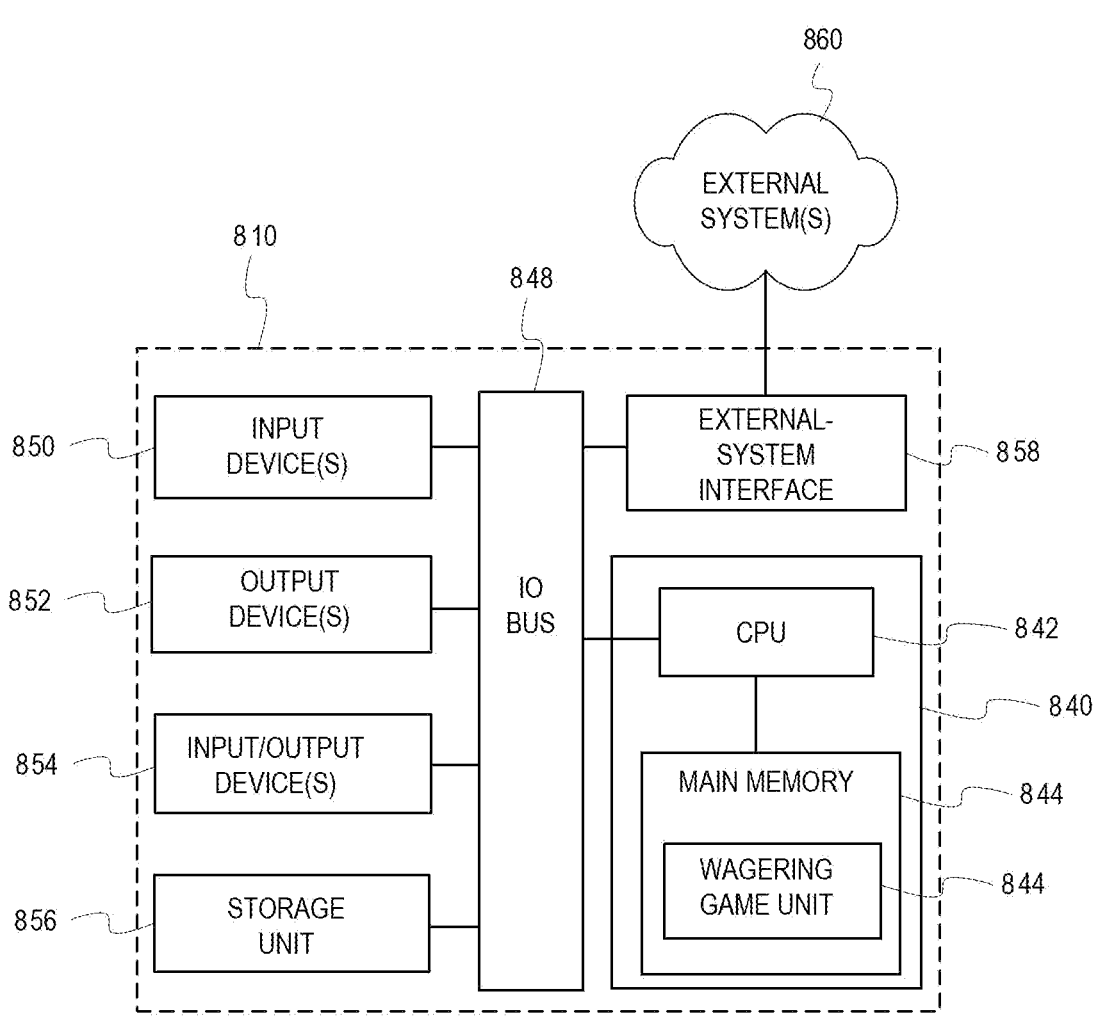
FIG. 8 is a schematic view of a gaming system according to one or more embodiments of the present disclosure.

FIG. 8 is schematic view of a gaming system according to at least some aspects of the disclosed concepts. Referring to FIG. 8, a gaming machine 810 includes game-logic circuitry 840 (e.g., securely housed within a locked box inside a gaming cabinet). The game-logic circuitry 840 includes a central processing unit (CPU) 842 connected to a main memory 844 that comprises one or more memory devices. The CPU 842 includes any suitable processor(s), such as those made by Intel and AMD. By way of example, the CPU 842 includes a plurality of microprocessors including a master processor, a slave processor, and a secondary or parallel processor. Game-logic circuitry 840, as used herein, comprises any combination of hardware, software, or firmware disposed in or outside of the gaming machine 810 that is configured to communicate with or control the transfer of data between the gaming machine 810 and a bus, another computer, processor, device, service, or network. The game-logic circuitry 840, and more specifically the CPU 842, comprises one or more controllers or processors and such one or more controllers or processors need not be disposed proximal to one another and may be located in different devices or in different locations. The game-logic circuitry 840, and more specifically a main memory 844, comprises one or more memory devices which need not be disposed proximal to one another and may be located in different devices or in different locations. The game-logic circuitry 840 is operable to execute all of the various gaming methods and other processes disclosed herein. The main memory 844 includes a wagering-game unit 846. In one embodiment, the wagering-game unit 846 causes wagering games to be presented, such as video poker, video blackjack, video slots, video lottery, etc., in whole or part.

The game-logic circuitry 840 is also connected to an input/output (I/O) bus 848, which can include any suitable bus technologies, such as an AGTL+ frontside bus and a PCI backside bus. The I/O bus 848 is connected to various input devices 850, output devices 852, and input/output devices 854.

By way of example, the output devices may include a primary display, a secondary display, and one or more audio speakers. The primary display or the secondary display may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 810. The gaming machine 810 can also include a touch screen(s) mounted over the primary or secondary displays, buttons on a button panel, a bill/ticket acceptor, a card reader/writer, a ticket dispenser, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, buttons, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The input/output devices 854 include one or more value input/payment devices and value output/payout devices. In order to deposit cash or credits onto the gaming machine 810, the value input devices are configured to detect a physical item associated with a monetary value that establishes a credit balance on a credit meter. The physical item may, for example, be currency bills, coins, tickets, vouchers, coupons, cards, and/or computer-readable storage mediums. The deposited cash or credits are used to fund wagers placed on the wagering game played via the gaming machine 810. Examples of value input devices include, but are not limited to, a coin acceptor, a bill/ticket acceptor (e.g., a bill validator), a card reader/writer, a wireless communication interface (e.g., communication device 103) for reading cash or credit data from a nearby mobile device, and a network interface for withdrawing cash or credits from a remote account via an electronic funds transfer. In response to a cashout input that initiates a payout from the credit balance on the "credits" meter, the value output devices are used to dispense cash or credits from the gaming machine 810. The credits may be exchanged for cash at, for example, a cashier or redemption station. Examples of value output devices include, but are not limited to, a coin hopper for dispensing coins or physical gaming tokens (e.g., chips), a bill dispenser, a card reader/writer, a ticket dispenser for printing tickets redeemable for cash or credits, a wireless communication interface for transmitting cash or credit data to a nearby mobile device, and a network interface for depositing cash or credits to a remote account via an electronic funds transfer.

The I/O bus 848 is also connected to a storage unit 856 and an external-system interface 858, which is connected to external system(s) 860 (e.g., wagering-game networks, communications networks, etc.).

The external system(s) 860 includes, in various aspects, a gaming network, other gaming machines or terminals, a gaming server, a remote controller, communications hardware, or a variety of other interfaced systems or components, in any combination. In yet other aspects, the external system(s) 860 comprises a player's portable electronic device (e.g., cellular phone, electronic wallet, etc.) and the external-system interface 858 is configured to facilitate wireless communication and data transfer between the portable electronic device and the gaming machine 810, such as by a near-field communication path operating via magnetic-field induction or a frequency-hopping spread spectrum RF signals (e.g., Bluetooth, etc.).

The gaming machine 810 optionally communicates with the external system(s) 860 such that the gaming machine 810 operates as a thin, thick, or intermediate client. The game-logic circuitry 840—whether located within ("thick client"), external to ("thin client"), or distributed both within and external to ("intermediate client") the gaming machine 810—is utilized to provide a wagering game on the gaming machine 810. In general, the main memory 844 stores programming for a random number generator (RNG), game-outcome logic, and game assets (e.g., art, sound, etc.)—all of which obtained regulatory approval from a gaming control board or commission and are verified by a trusted authentication program in the main memory 844 prior to game execution. The authentication program generates a live authentication code (e.g., digital signature or hash) from the memory contents and compares it to a trusted code stored in the main memory 844. If the codes match, authentication is deemed a success and the game is permitted to execute. If, however, the codes do not match, authentication is deemed a failure that must be corrected prior to game execution. Without this predictable and repeatable authentication, the gaming machine 810, external system(s) 860, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 842 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 842 when executing the game-outcome logic to determine a resultant outcome for that instance of the wagering game. The resultant outcome is then presented to a player of the gaming machine 810 by accessing the associated game assets, required for the resultant outcome, from the main memory 844. The CPU 842 causes the game assets to be presented to the player as outputs from the gaming machine 810 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 810 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 810 may include additional peripheral devices or more than one of each component shown in FIG. 8. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 9:
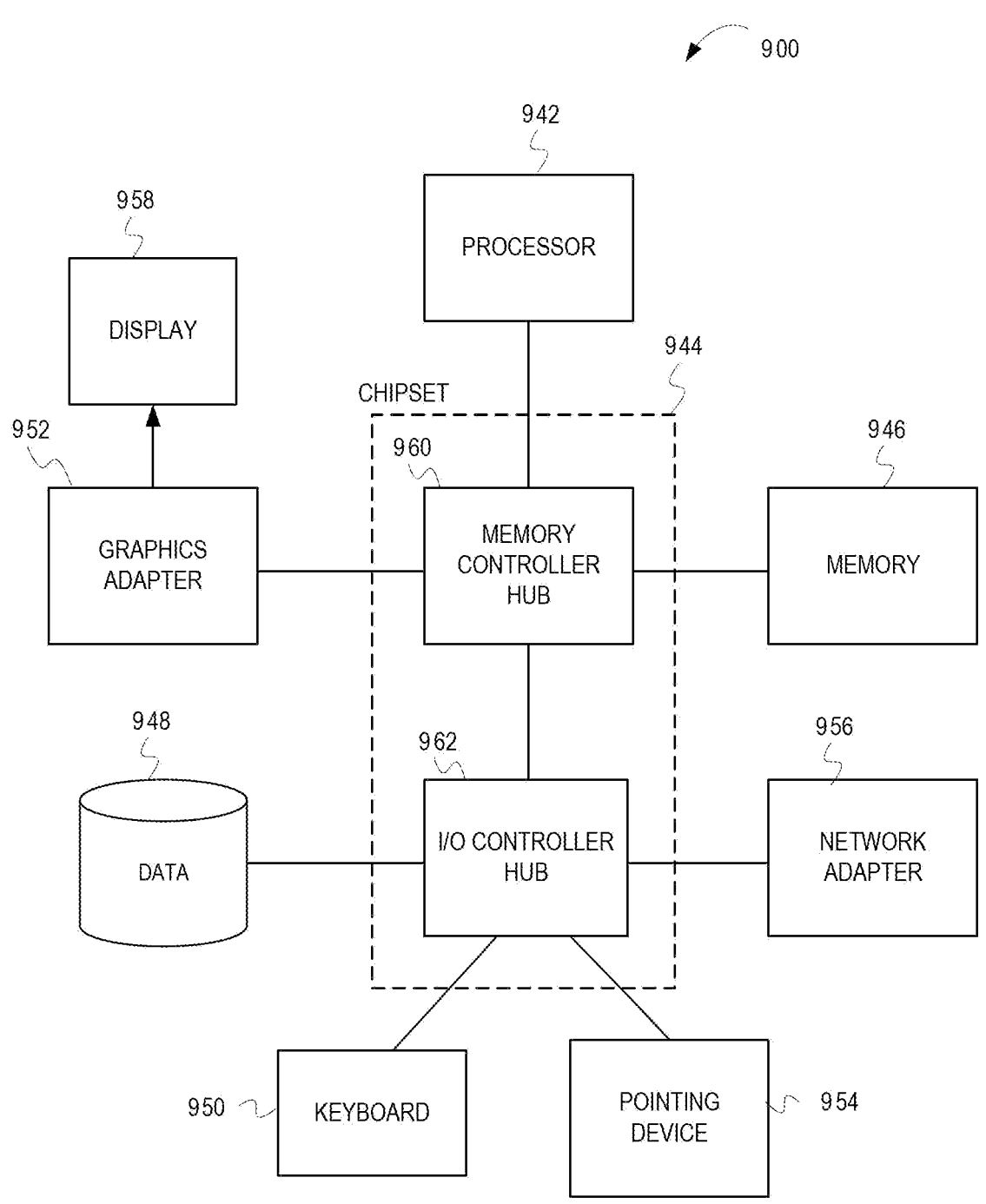
FIG. 9 is a block diagram of a computer system according to one or more embodiments of the present disclosure.

FIG. 9 is shown a block diagram of a computer system 900 according to one or more embodiments. The computer system 900 includes at least one processor 942 coupled to a chipset 944, as indicated in dashed lines. Also coupled to the chipset 944 are memory 946, a storage device 948, a keyboard 950, a graphics adapter 952, a pointing device 954, and a network adapter 956. A display 958 is coupled to the graphics adapter 952. In one embodiment, the functionality of the chipset 944 is provided by a memory controller hub 960 and an I/O controller hub 962. In another embodiment, the memory 946 is coupled directly to the processor 942 instead of to the chipset 944.

The storage device 948 is any non-transitory computer-readable storage medium, such as a hard drive, a compact disc read-only memory (CD-ROM), a DVD, or a solid-state memory device (e.g., a flash drive). The memory 946 holds instructions and data used by the processor 942. The pointing device 954 may be a mouse, a track pad, a track ball, or another type of pointing device, and it is used in combination with the keyboard 950 to input data into the computer system 900. The graphics adapter 952 displays images and other information on the display 958. The network adapter 956 couples the computer system 900 to a local or wide area network.

As is known in the art, the computer system 900 can have different and/or other components than those shown in FIG. 9. In addition, the computer system 900 can lack certain illustrated components. In one embodiment, the computer system 900 acting as the gateway 120 (FIG. 1) may lack the keyboard 950, pointing device 954, graphics adapter 952, and/or display 958. Moreover, the storage device 948 can be local and/or remote from the computer system 900 (such as embodied within a storage area network (SAN)). Moreover, other input devices, such as, for example, touch screens may be included.

The network adapter 956 (may also be referred to herein as a communication device) may include one or more devices for communicating using one or more of the communication media and protocols discussed above with respect to FIG. 1, FIG. 2, FIG. 3, FIG. 4, FIG. 5, FIG. 6, FIG. 7 or FIG. 8.

In addition, some or all of the components of this general computer system 900 of FIG. 9 may be used as part of the processor and memory discussed above with respect to the systems or devices described for FIG. 1, FIG. 2, FIG. 3, FIG. 4, FIG. 5, FIG. 6, FIG. 7 or FIG. 8.

In some embodiments, a gaming system may comprise several such computer systems 900. The gaming system may include load balancers, firewalls, and various other components for assisting the gaming system to provide services to a variety of user devices.

The computer system 900 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 948, loaded into the memory 946, and executed by the processor 942.

FIG. 2, FIG. 3, and FIG. 6 described by way of example above, represent data processing methods (e.g., algorithms) that correspond to at least some instructions stored and executed by a processor and/or logic circuitry associated with the gateway 120 and/or with the player interface device 106. However other embodiments can utilize processors and/or logic circuitry of any of the devices described for FIG. 1, FIG. 2, FIG. 3, FIG. 4, FIG. 5, FIG. 6, FIG. 7, FIG. 8, or FIG. 9 to perform the above described functions associated with the disclosed concepts. For example, in some embodiments, a player interface device is not used, rather a gaming machine (e.g., gaming machine 110 or gaming machine 810) can be in direct communication with a casino management system (e.g., CMS 116) and can transmit, to the casino management system, tokens for any payment-card transactions that occur at the gaming machine. The tokens can be tracked based on a timing of when the payment-card transactions occurred and/or how much money is transacted within a given period. In some embodiments, the tokens can be tracked without the use of a player account identifier. For instance, the casino management system can determine whether a certain number of payment-card transactions have occurred for a given token and/or if a general spending limit (e.g., one that is not necessarily tied to a specific player account) is exceeded by any amounts of the payment-card transactions. The casino management system can communicate the information directly to the gaming machine for presentation via an electronic display of the gaming machine.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A method comprising:
initiating, by a processor in response to user input via a player interface device connected to a gaming machine and a gaming network, a payment-card transaction to purchase game credits for use at the gaming machine;
obtaining, by the processor from a payment terminal in response to initiating the payment-card transaction, a token that replaces sensitive payment-card information;
searching, by the processor, a database of transaction records using the token as a search parameter to identify at least one transaction record associated with the token;
in response to identifying the at least one transaction record, copying from the at least one transaction record a player account identifier associated with a player account;
determining, by the processor in response to copying the player account identifier, a previous use of the player account, via the gaming network, for one or more additional payment-card transactions that occurred via the gaming network within a given period;
determining, by the processor in response to determining the previous use of the player account, whether a spending limit, for the player account associated with the token, would be exceeded by an amount of the payment-card transaction; and
presenting, by the processor via a display, an indication of whether the spending limit would be exceeded.

2. The method of claim 1, wherein the obtaining the token comprises:
obtaining the token from a payment service provider system communicatively coupled to the payment terminal via the gaming network and at least one telecommunication network, wherein the payment service provider system is authorized to replace the sensitive payment-card information, from the payment-card transaction, with the token.

3. The method of claim 1, wherein initiating the payment-card transaction comprises:
presenting, by the processor via the display, an input control associated with the amount; detecting, via the display, the user input in connection with the input control;
determining, in response to the user input, the amount;
passing, by the processor, the amount to the payment terminal;
presenting, via the display, an indication to use the payment terminal to conduct a payment-card action via the payment terminal for the amount; and
electronically communicating, in response to the payment-card action via the payment terminal, the payment-card transaction to the payment service provider system via a payment gateway associated with the gaming network.

4. The method of claim 1, wherein the amount of the payment-card transaction is for a first monetary amount, and wherein the determining whether the spending limit would be exceeded comprises:
determining, by the processor, a second monetary amount comprising a total for the one or more additional payment-card transactions; and
determining, by the processor in response to determining the second monetary amount, whether a total of the first monetary amount and the second monetary amount would exceed the spending limit.

5. The method of claim 1, further comprising:
prior to initiating the payment-card transaction, conducting, by the processor, the one or more additional payment-card transactions via the gaming network while the player account is logged in via either the player interface device or one or more additional player interface devices communicatively coupled to the gaming network;
receiving, by the processor during the conducting, one or more tokens for the one or more additional payment-card transactions, wherein the token comprises one of the one or more tokens; and
in response to receiving the one or more tokens, associating, by the processor in a database, the one or more tokens with a player account identifier for the player account.

6. The method of claim 5, wherein the given period is indicated in a spending-limit setting of the player account, and wherein the determining the previous use of the token for the one or more additional payment-card transactions that occurred via the gaming network within the given period comprises:
accessing, by the processor, the setting to ascertain the given period; and searching the database, by the processor based on time stamps within the given period, for payment-card transactions that are associated with one or more of the player account identifier or the token.

7. The method of claim 1, wherein the determining the previous use of the token for the one or more additional payment-card transactions that occurred within the given period comprises determining, by the processor, that the token is associated with at least one transaction record stored in a database communicatively coupled to the gaming network.

8. The method of claim 7, wherein the database comprises transaction records for the one or more additional payment-card transactions, and wherein determining that the token is associated with the at least one transaction record comprises:

searching, by the processor using the token as a search parameter, the transaction records, wherein the at least one transaction record is included in the transaction records;

in response to detecting the token in the at least one transaction record, copying from the at least one transaction record a player account identifier associated with the player account; and searching, based on the player account identifier, additional ones of the transaction records for the one or more additional payment-card transactions.

9. The method of claim 7, wherein prior to initiating the payment-card transaction, and after receiving the user input, determining, by the processor, that the player account is not logged in to the player interface device, and wherein determining that the token is associated with at least one transaction stored in the database is in response to detecting that the player account is not logged in.

10. The method of claim 1, wherein the payment terminal is authorized for access to the sensitive payment-card information for encrypted communication with the payment service provider system, and wherein the player interface device is not authorized for access to the sensitive payment-card information.

11. The method of claim 1, wherein the payment terminal is compliant with at least one level of regulatory requirements of the Payment Card Industry Data Security Standard (PCI DSS).

12. The method of claim 1, wherein the sensitive payment-card information comprises one or more of a payment-card primary account number and a user PIN, wherein the token is obtained from a token vault of the payment service provider system, and wherein the token is uniquely assigned, in the token vault, with a payment card associated with the payment-card transaction and at least one of the one or more additional payment-card transactions.

13. A gaming system comprising:

a display; and a processor communicatively coupled to a telecommunication network and gaming network, wherein the processor is configured to execute instructions that, when executed, cause the gaming system to perform operations to:

initiate, in response to user input via the display, a payment-card transaction to purchase game credits for use at a gaming machine connected to the gaming network;

obtain, from a payment terminal in response to initiating the payment-card transaction, a token from a payment service provider system communicatively coupled to the payment terminal via the gaming network and the telecommunication network, wherein the payment service provider system is authorized to replace sensitive payment-card information, from the payment-card transaction, with the token;

search a database of transaction records using the token as a search parameter to identify at least one transaction record associated with the token;

in response to identifying the at least one transaction record, copy from the at least one transaction record a player account identifier associated with a player account;

determine, in response to copying the player account identifier, a previous use of the player account, via the gaming network, for one or more additional payment-card transactions that occurred via the gaming network within a given period;

determine, in response to determining the previous use of the player account, whether a spending limit, for the player account, would be exceeded by an amount of the payment-card transaction; and transmit, for presentation via the display, an indication of whether the spending limit would be exceeded.

14. The gaming system of claim 13, wherein the operation to initiate the payment-card transaction includes operations to:

present, via the display, an input control associated with the amount;

detect, via the display, the user input in connection with the input control;

determine, in response to the user input, the amount;

pass the amount to the payment terminal;

present, via the display, an indication to use the payment terminal to conduct a payment-card action via the payment terminal for the amount; and electronically communicate, in response to the payment-card action via the payment terminal, the payment-card transaction to the payment service provider system via a payment gateway associated with the gaming network.

15. The gaming system of claim 13, wherein the amount of the payment-card transaction is for a first monetary amount, and wherein the operation to determine whether the spending limit would be exceeded includes operations to:

determine a second monetary amount comprising a total for the one or more additional payment-card transactions; and determine, in response to determining the second monetary amount, whether a total of the first monetary amount and the second monetary amount would exceed the spending limit.

16. The gaming system of claim 13, wherein the processor is configured to execute instructions that, when executed, cause the gaming system to further perform operations to:

prior to initiating the payment-card transaction, conduct the one or more additional payment-card transactions via the gaming network while the player account is logged in via a player interface device communicatively coupled to the gaming network;

receive, during the conducting, one or more tokens for the one or more additional payment-card transactions, wherein the token comprises one of the one or more tokens; and in response to receiving the one or more tokens, associate, in a database, the one or more tokens with a player account identifier for the player account.

17. The gaming system of claim 16, wherein the given period is indicated in a spending-limit setting of the player account, and wherein the operation to determine the previous use of the token for the one or more additional payment-card transactions that occurred via the gaming network within the given period includes operations to:

access, via the gaming network, the setting to ascertain the given period; and search the database, based on time stamps within the given period, for payment-card transactions that are associated with one or more of the player account identifier or the token.

18. The gaming system of claim 16, wherein the operation to determine the previous use of the token for the one or more additional payment-card transactions that occurred within the given period includes operations to determine that the token is associated with at least one transaction record stored in the database.

19. The gaming system of claim 18, wherein the database comprises transaction records for the one or more additional payment-card transactions, and wherein the operation to determine that the token is associated with the at least one transaction record includes operations to:

search, using the token as a search parameter, the transaction records, wherein the at least one transaction record is included in the transaction records;

in response to detecting the token in the at least one transaction record, copy from the at least one transaction record the player account identifier; and search, based on the player account identifier, additional ones of the transaction records for the one or more additional payment-card transactions.

20. The gaming system of claim 17, wherein prior to the operation to initiate the payment-card transaction, and after receiving the user input, the gaming system is configured to perform further operations to determine that the player account is not logged in to the player interface device, and wherein the operation to determine that the token is associated with at least one transaction stored in the database is in response to an operation to detect that the player account is not logged in.

21. A non-transitory computer-readable storage medium storing instructions that, when executed by a processor, cause the processor to perform operations comprising:

initiating, in response to user input via a player interface device connected to a gaming machine and a gaming network, a payment-card transaction to purchase game credits for use at the gaming machine;

obtaining, from a payment terminal in response to the operation of initiating the payment-card transaction, a token that replaces sensitive payment-card information;

searching a database of transaction records using the token as a search parameter to identify at least one transaction record associated with the token;

copying, from the at least one transaction record in response to identifying the at least one transaction record, a player account identifier associated with a player account;

determining, in response to the operation of copying the player account identifier, a previous use of the player account, via the gaming network, for one or more additional payment-card transactions that occurred via the gaming network within a given period;

determining, in response to the operation of determining the previous use of the player account, whether a spending limit, for the player account associated with the token, would be exceeded by an amount of the payment-card transaction; and presenting, via a display, an indication of whether the spending limit would be exceeded.

\* \* \* \* \*